US010571929B2

(12) United States Patent
Hur

(10) Patent No.: US 10,571,929 B2
(45) Date of Patent: Feb. 25, 2020

(54) MOBILE TERMINAL AND CONTROL METHOD THEREFOR

(71) Applicant: LG ELECTRONICS INC., Seoul (KR)

(72) Inventor: Juneseok Hur, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 290 days.

(21) Appl. No.: 15/572,147

(22) PCT Filed: Sep. 3, 2015

(86) PCT No.: PCT/KR2015/009313
§ 371 (c)(1),
(2) Date: Nov. 6, 2017

(87) PCT Pub. No.: WO2016/182132
PCT Pub. Date: Nov. 17, 2016

(65) Prior Publication Data
US 2018/0129224 A1 May 10, 2018

(30) Foreign Application Priority Data
May 8, 2015 (KR) .................. 10-2015-0064711

(51) Int. Cl.
*G05D 1/04* (2006.01)
*H04N 5/232* (2006.01)
(Continued)

(52) U.S. Cl.
CPC ............... *G05D 1/04* (2013.01); *B64D 47/08* (2013.01); *G05D 1/0094* (2013.01);
(Continued)

(58) Field of Classification Search
CPC .. G05D 1/04; G05D 1/0094; H04N 5/232933; H04N 5/23216; H04N 5/23206;
(Continued)

(56) References Cited

U.S. PATENT DOCUMENTS 8,214,088 B2 * 7/2012 Lefebure ............... A63H 27/12
244/189
8,521,339 B2 * 8/2013 Gariepy ............... B64C 39/024
244/190
(Continued)

FOREIGN PATENT DOCUMENTS

KR 20080048348 6/2008
KR 20120105201 9/2012
(Continued)

OTHER PUBLICATIONS

European Patent Office Application Serial No. 15891948.0, Search Report dated Jan. 8, 2019, 7 pages.
(Continued)

*Primary Examiner* — Jaime Figueroa
(74) *Attorney, Agent, or Firm* — Lee, Hong, Degerman, Kang & Waimey PC

(57) ABSTRACT

The present invention relates to a mobile terminal and a control method thereof. The mobile terminal according to the present invention comprises: a camera; a wireless communication unit for communicating with an external mobile photographing device; a display unit for outputting a preview image captured by the camera and detecting a touch input for designating a photographing region to be photographed by the mobile photographing device; and a control unit for controlling the wireless communication unit such that photographing guide information calculated on the basis of the photographing region is transmitted to the mobile photographing device on the basis of applying the touch input for designating the photographing region to the pre-
(Continued)

view image and a preview image captured by the mobile photographing device according to the photographing guide information is received, and controlling the display unit such that the preview image captured by the mobile photographing device is outputted.

20 Claims, 36 Drawing Sheets

(51) Int. Cl.
H04N 13/239 (2018.01)
G05D 1/00 (2006.01)
H04M 1/725 (2006.01)
B64D 47/08 (2006.01)
G06F 3/041 (2006.01)

(52) U.S. Cl.
CPC .......... G06F 3/0412 (2013.01); H04M 1/725 (2013.01); H04N 5/232 (2013.01); H04N 5/23206 (2013.01); H04N 5/23216 (2013.01); H04N 5/23293 (2013.01); H04N 5/23296 (2013.01); H04N 5/232933 (2018.08); H04N 13/239 (2018.05); B64C 2201/02 (2013.01)

(58) Field of Classification Search
CPC ............. H04N 13/239; H04N 5/23296; H04N 5/23293; H04N 5/232; H04M 1/725; G06F 3/0412; B64D 47/08; B64C 2201/02
USPC ..................................... 701/1, 523
See application file for complete search history.

(56) References Cited

U.S. PATENT DOCUMENTS

| | | | |
|---|---|---|---|
| 8,903,568 B1 | 12/2014 | Wang et al. | |
| 9,635,248 B2* | 4/2017 | Yang | H04N 5/23222 |
| 2009/0157233 A1* | 6/2009 | Kokkeby | G01S 3/7864 |
| | | | 701/3 |
| 2011/0311099 A1* | 12/2011 | Derbanne | G06T 7/207 |
| | | | 382/103 |
| 2012/0095621 A1* | 4/2012 | Zhu | G05D 1/101 |
| | | | 701/3 |
| 2012/0307042 A1* | 12/2012 | Lee | G08G 5/0069 |
| | | | 348/114 |
| 2013/0162822 A1* | 6/2013 | Lee | H04N 7/185 |
| | | | 348/146 |
| 2013/0176423 A1* | 7/2013 | Rischmuller | G05D 1/0038 |
| | | | 348/114 |
| 2014/0008496 A1* | 1/2014 | Ye | B64C 13/20 |
| | | | 244/190 |
| 2014/0300809 A1 | 10/2014 | Oliveira | |
| 2014/0316614 A1* | 10/2014 | Newman | G06Q 30/0611 |
| | | | 701/3 |
| 2014/0327770 A1* | 11/2014 | Wagreich | G05D 1/0038 |
| | | | 348/148 |
| 2014/0353422 A1* | 12/2014 | Westbrook, Sr. | B64C 39/024 |
| | | | 244/17.21 |
| 2015/0052479 A1* | 2/2015 | Ooi | G06F 3/04815 |
| | | | 715/810 |
| 2015/0142211 A1* | 5/2015 | Shehata | H04N 7/181 |
| | | | 701/2 |
| 2016/0117811 A1* | 4/2016 | Tariolle | A63H 27/12 |
| | | | 348/144 |
| 2016/0129999 A1* | 5/2016 | Mays | B64C 39/024 |
| | | | 701/2 |
| 2016/0191793 A1* | 6/2016 | Yang | H04N 5/23222 |
| | | | 348/207.11 |
| 2016/0306351 A1* | 10/2016 | Fisher | H04W 4/70 |
| 2016/0343118 A1* | 11/2016 | Olsen | G06T 5/009 |
| 2016/0373662 A1* | 12/2016 | Olsen | G06K 9/0063 |
| 2017/0034428 A1* | 2/2017 | Kwon | G06F 3/04817 |
| 2017/0214856 A1* | 7/2017 | Liao | G06T 7/70 |
| 2018/0155023 A1* | 6/2018 | Choi | B64C 39/024 |
| 2018/0249091 A1* | 8/2018 | Ding | H04N 5/23232 |
| 2019/0082101 A1* | 3/2019 | Baldwin | H04N 5/2258 |

FOREIGN PATENT DOCUMENTS

| | | |
|---|---|---|
| KR | 20130032776 | 4/2013 |
| KR | 20140075963 | 6/2014 |

OTHER PUBLICATIONS

PCT International Application No. PCT/KR2015/009313, International Search Report dated Feb. 5, 2016, 4 pages.

* cited by examiner

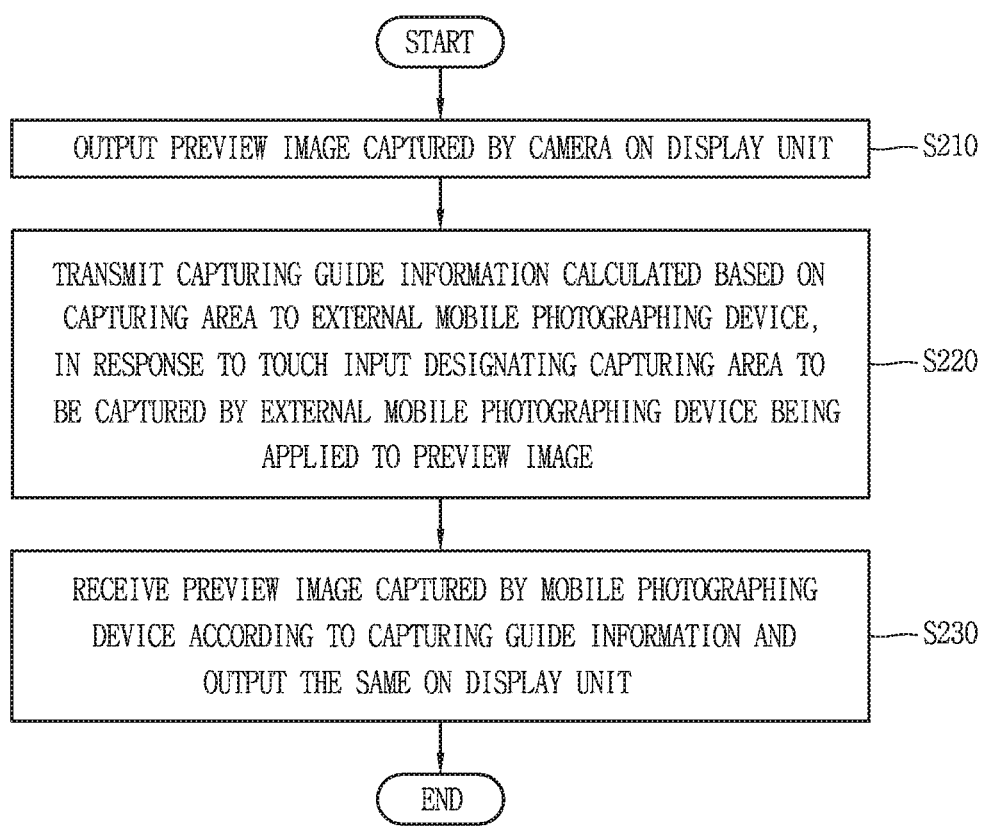

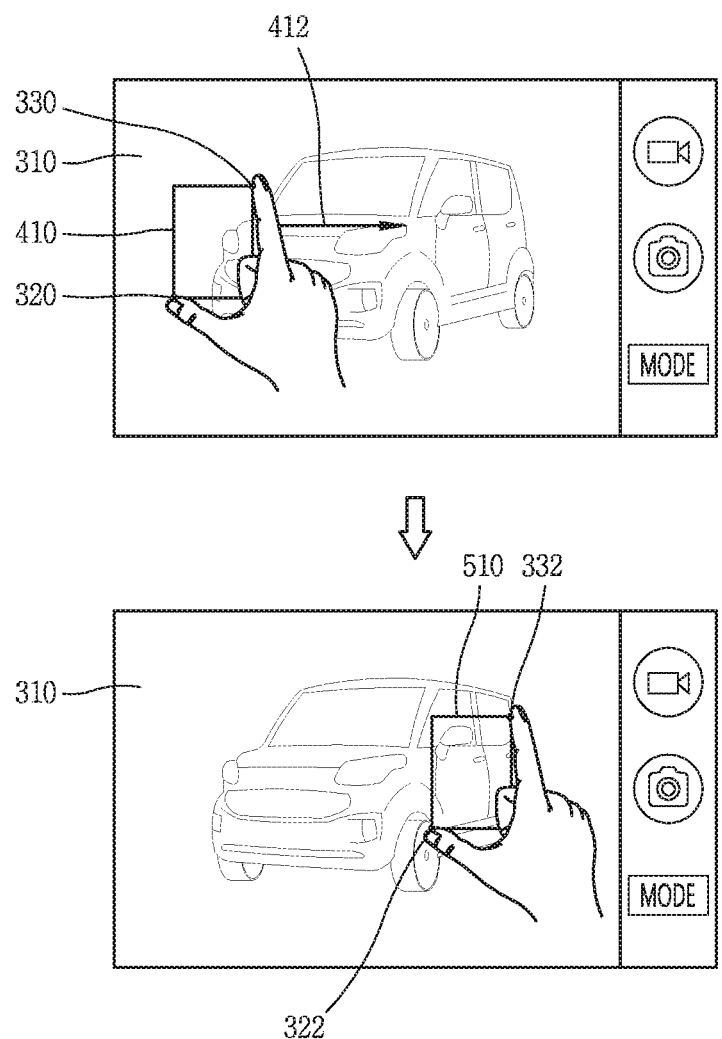

FIG. 13A
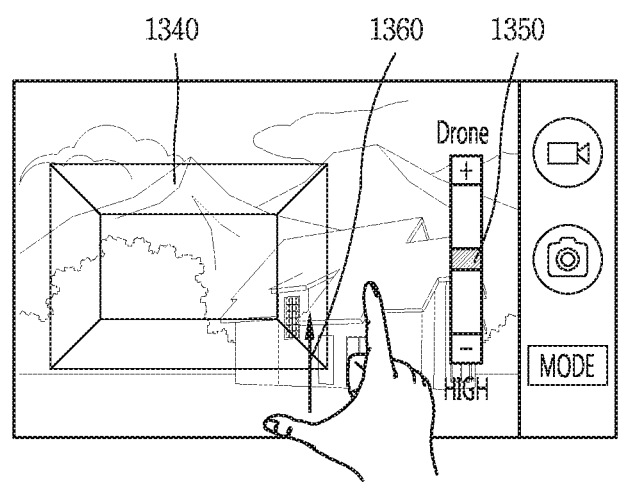
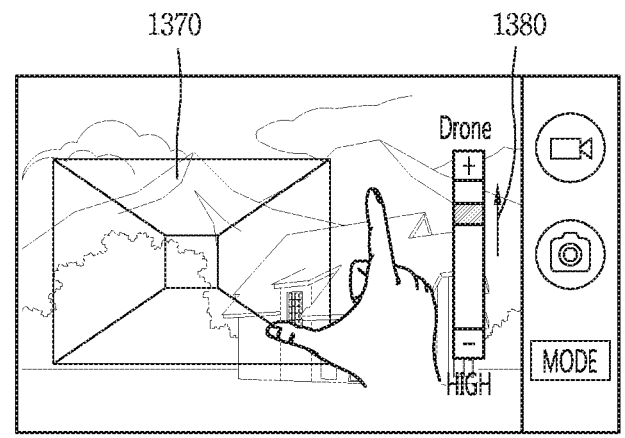

FIG. 16B
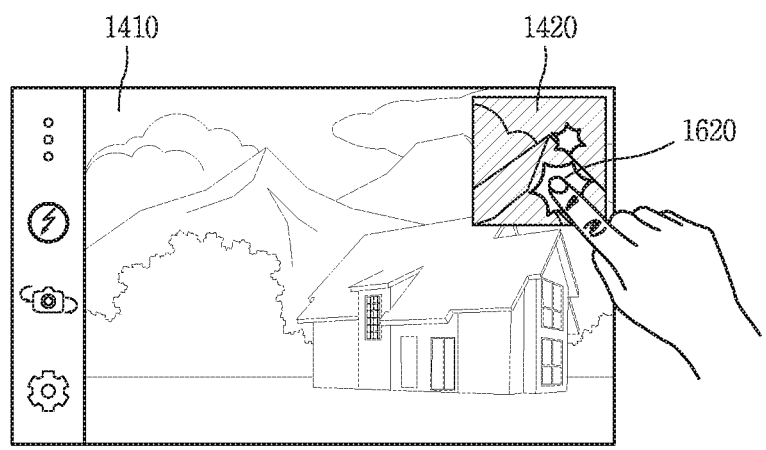
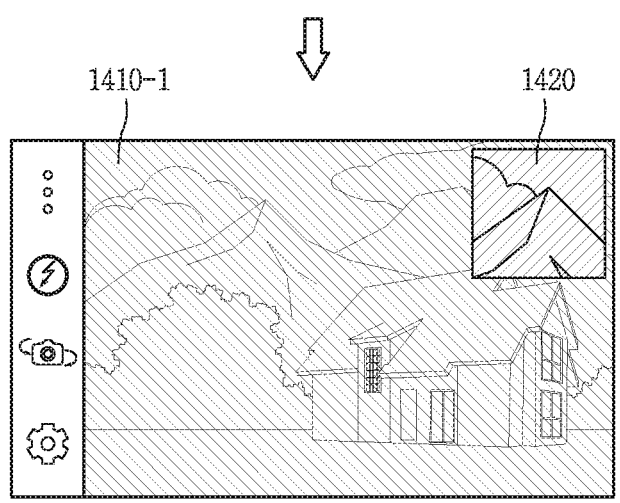

FIG. 17A
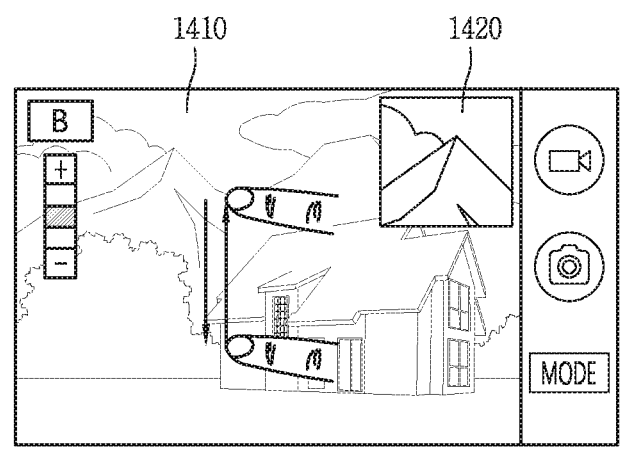
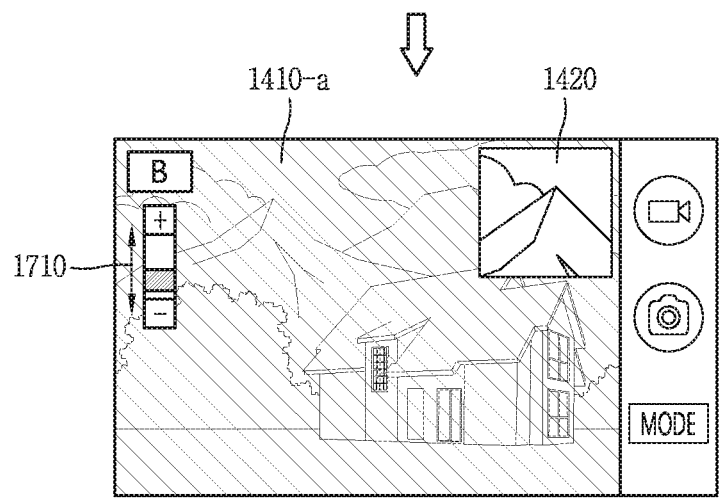

FIG. 17C
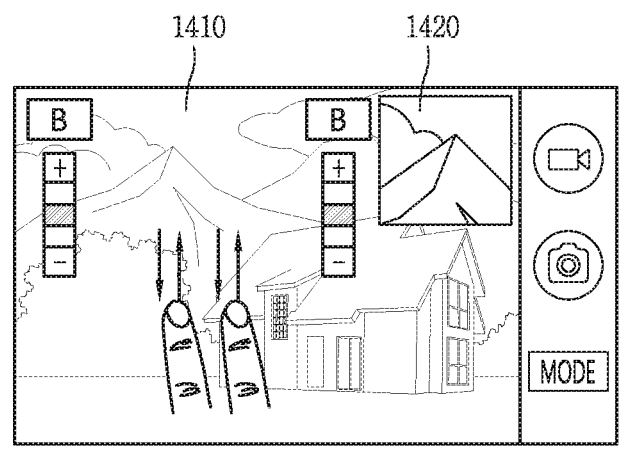
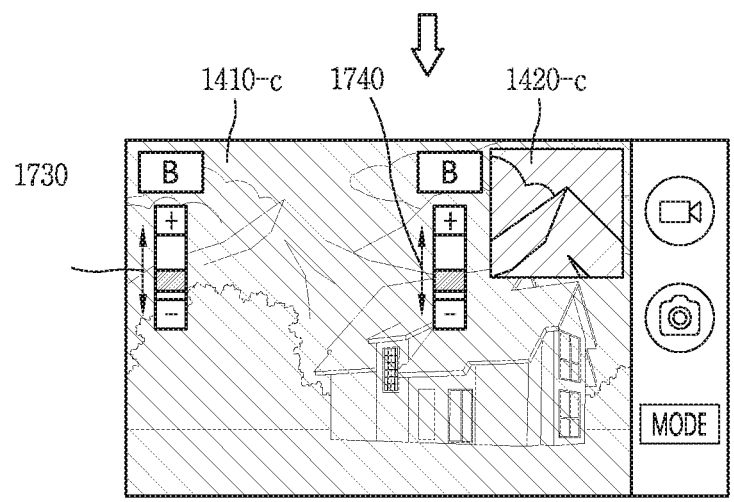

FIG. 18A
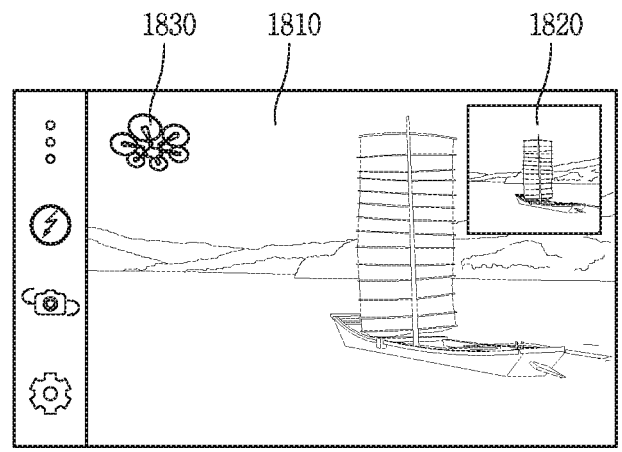
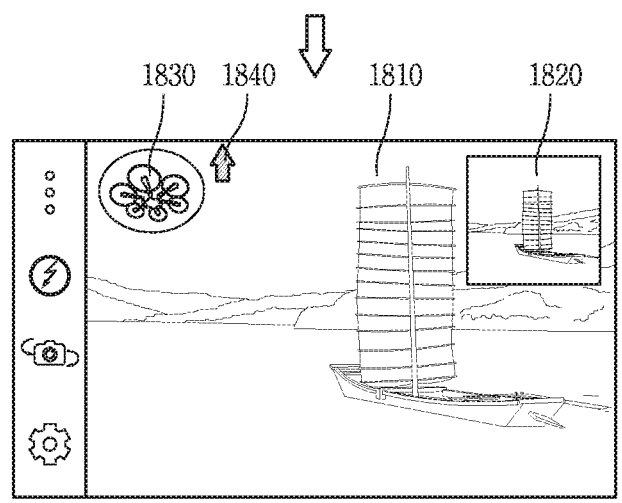
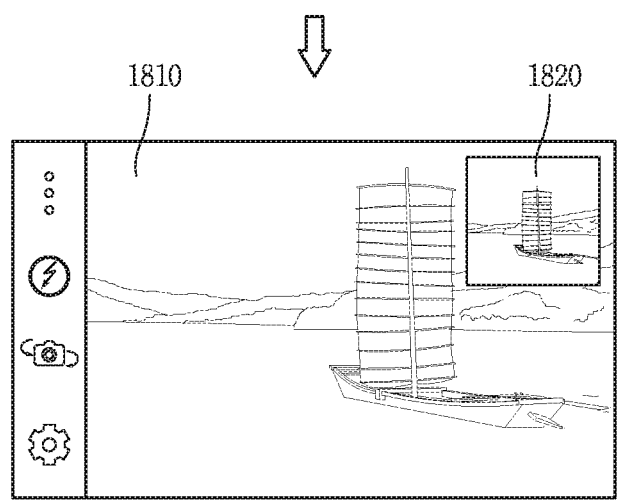

FIG. 18B
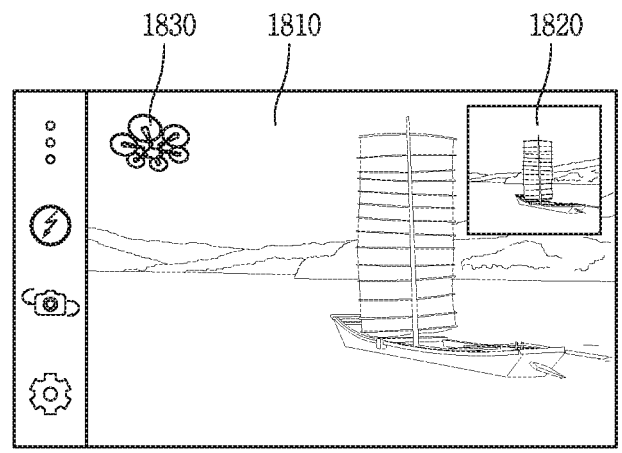
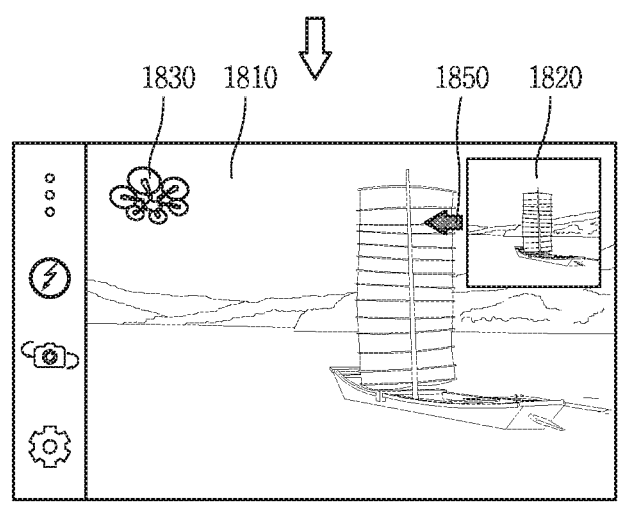
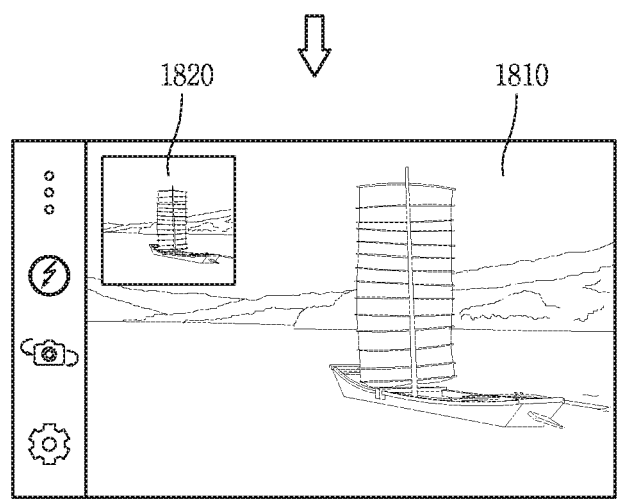

MOBILE TERMINAL AND CONTROL METHOD THEREFOR

CROSS-REFERENCE TO RELATED APPLICATION

This application is the National Stage filing under 35 U.S.C. 371 of International Application No. PCT/KR2015/009313, filed on Sep. 3, 2015, which claims the benefit of earlier filing date and right of priority to Korean Application No. 10-2015-0064711, filed on May 8, 2015, the contents of which are all hereby incorporated by reference herein in their entirety.

TECHNICAL FIELD

The present invention relates to a mobile terminal capable of performing communication with a drone camera, and a method for controlling the same.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Also, the mobile terminal may generate a control signal for controlling an external capturing (or photographing) device such as a drone camera and transmit the control signal to control the drone camera. Accordingly, a user interface for more effectively controlling the drone camera is required.

Efforts are ongoing to support and increase the functionality of mobile terminals. Such efforts include software and hardware improvements, as well as changes and improvements in the structural components.

DISCLOSURE OF THE INVENTION

The present invention is directed to solving the above-mentioned problems and other drawbacks. Another aspect of the present invention is to provide a mobile terminal capable of generating capturing guide information for effectively controlling a drone camera, and a control method thereof.

To achieve these and other advantages and in accordance with the purpose of this specification, as embodied and broadly described herein, there is provided a mobile terminal, including a camera, a wireless communication unit configured to perform communication with an external mobile photographing device, a display unit configured to output a preview image captured by the camera and detect a touch input for designating a capturing area to be captured by the mobile photographing device, and a controller configured to control, in response to the touch input for designating the capturing area being applied to the preview image, the wireless communication unit such that capturing guide information calculated based on the capturing area is transmitted to the mobile photographing device and a preview image captured by the mobile photographing device according to the capturing guide information is received, and control the display unit to output the preview image captured by the mobile photographing device.

In an embodiment, the controller may calculate the capturing guide information based on the capturing area, in response to a multi-touch input for designating the capturing area being applied to the preview image captured by the camera.

In an embodiment, the controller may set the capturing area in a preset manner based on a multi-touch point to which the multi-touch input has been applied.

In an embodiment, the controller may calculate the capturing guide information based on the capturing area, in response to a pinch-in or pinch-out input for designating the capturing area being applied to the preview image captured by the camera.

In an embodiment, the controller may set the capturing area to include the preview image based on a degree of the pinch-in input applied the preview image.

In an embodiment, the controller may set the capturing area to be included in the preview image based on a degree of the pinch-out input applied to the preview image.

In an embodiment, the controller may calculate the capturing guide information based on a capturing altitude of the mobile photographing device, in response to a user input for designating the capturing altitude being applied.

In an embodiment, the controller may calculate the capturing guide information based on a capturing direction of the mobile photographing device, in response to a user input for designating the capturing direction being applied.

In an embodiment, the controller may control the display unit to output both of the preview image captured by the camera and the preview image captured by the mobile photographing device according to the capturing guide information.

In an embodiment, the controller may change a capturing setting value for at least one of the preview image captured by the camera and the preview image captured by the mobile photographing device, in response to a preset touch input being applied.

To achieve these and other advantages and in accordance with the purpose of this specification, as embodied and broadly described herein, there is provided a method for controlling a mobile terminal, the method including (a) outputting a preview image captured by a camera on a display unit, (b) transmitting capturing guide information calculated based on a capturing area, which is to be captured by an external mobile photographing device, to a mobile photographing device, in response to a touch input for designating the capturing area being applied to the preview image, and (c) receiving a preview image captured by the mobile photographing device according to the capturing guide information and outputting the preview image on the display unit.

In an embodiment, the step (b) may include calculating the capturing guide information based on the capturing area, in response to a multi-touch input for designating the capturing area being applied to the preview image captured by the camera.

In an embodiment, the step (b) may include setting the capturing area in a preset manner based on a multi-touch point to which the multi-touch input has been applied.

In an embodiment, the step (b) may include calculating the capturing guide information based on the capturing area, in response to a pinch-in or pinch-out input for designating the capturing area being applied to the preview image captured by the camera.

In an embodiment, the step (b) may include setting the capturing area to include the preview image based on a degree of the pinch-in input applied to the preview image.

In an embodiment, the step (b) may include setting the capturing area to be included in the preview image based on a degree of the pinch-out input applied to the preview image.

In an embodiment, the step (b) may include calculating the capturing guide information based on a capturing altitude of the mobile photographing device, in response to a user input for designating the capturing altitude being applied.

In an embodiment, the step (b) may include calculating the capturing guide information based on a capturing direction of the mobile photographing device, in response to a user input for designating the capturing direction being applied.

In an embodiment, the step (c) may include outputting both of the preview image captured by the camera and the preview image captured by the mobile photographing device according to the capturing guide information.

In an embodiment, the method may further include (d) changing a capturing setting value for at least one of the preview image captured by the camera and the preview image captured by the mobile photographing device according to the capturing guide information, in response to a preset touch input being applied.

EFFECTS OF THE INVENTION

Hereinafter, effects of a mobile terminal and a method of controlling the same according to the present invention will be described.

According to at least one of embodiments of the present invention, a capturing area of a drone camera can be set by the mobile terminal.

In addition, according to at least one of embodiments of the present invention, a capturing altitude and a capturing direction of a drone camera can be set by the mobile terminal.

Then, capturing setting values for the mobile terminal and the drone camera can be changed.

This may result in improving user convenience.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF THE DRAWINGS

FIG. 2 is a flowchart illustrating a representative control method of a mobile terminal according to the present invention.

FIGS. 5A to 5E are conceptual views illustrating an embodiment for changing a capturing area.

FIGS. 13A and 13B are conceptual views illustrating an embodiment of setting a capturing height and a capturing direction using a three-dimensional (3D) image.

FIGS. 16A to 16C and 17A to 17C are conceptual views illustrating embodiments in which brightness of a preview image is changed.

FIGS. 18A and 18B are conceptual views illustrating an embodiment in which a drone camera is captured in a preview image.

BEST MODE OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
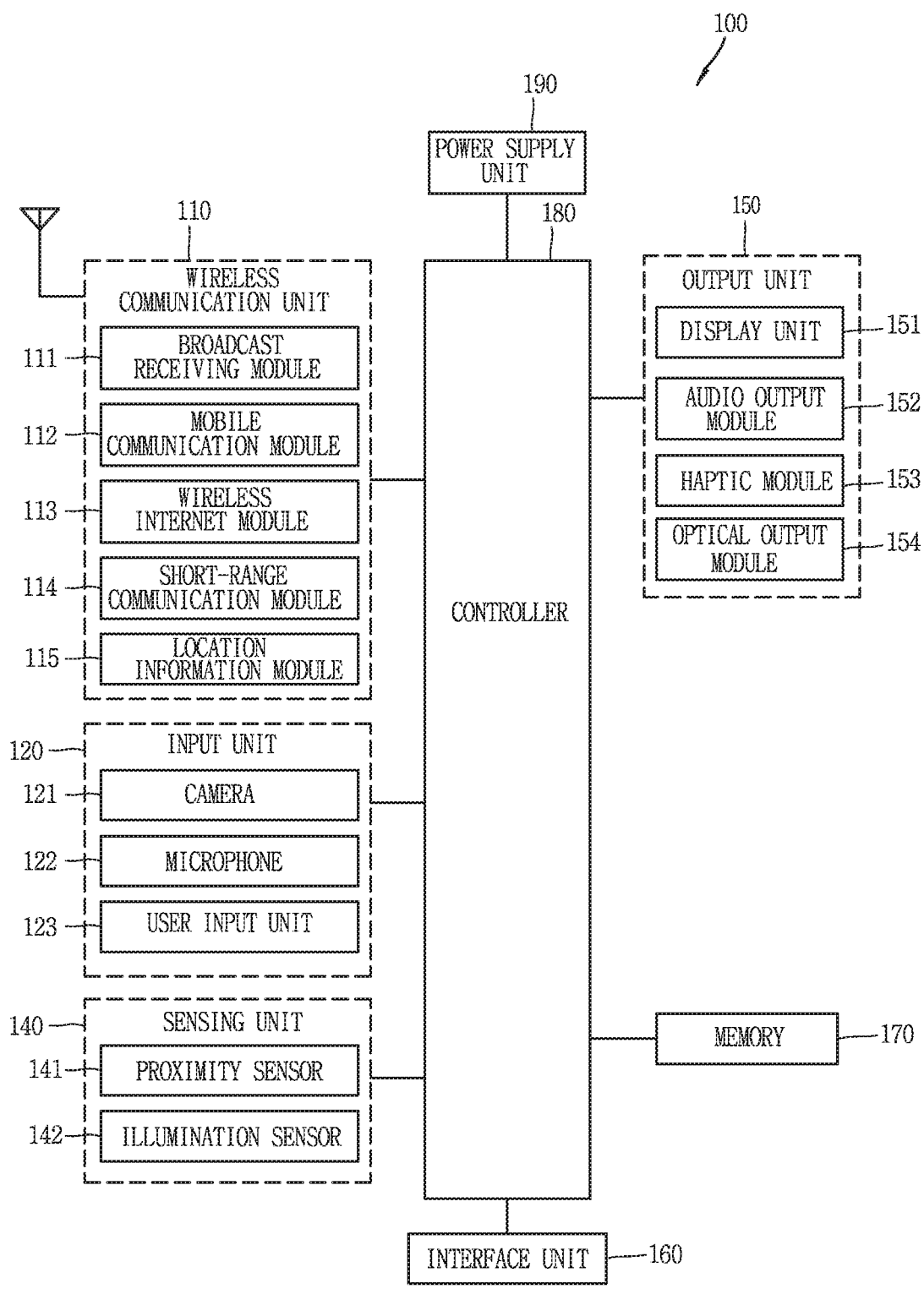
FIG. 1A is a block diagram of a mobile terminal in accordance with one exemplary embodiment of the present invention.
Figure 1B:
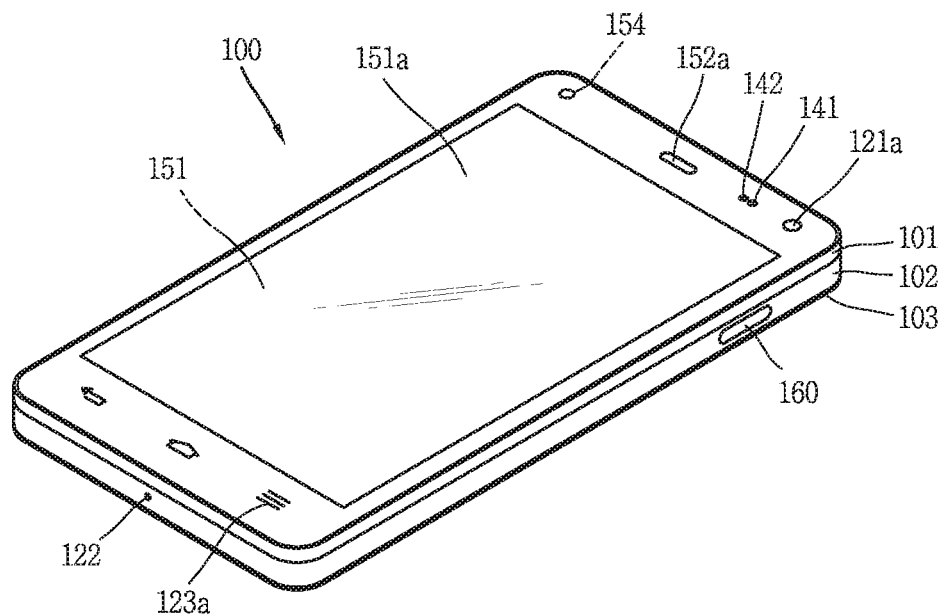
FIGS. 1B and 1C are conceptual views illustrating one example of a mobile terminal according to the present invention, viewed from different directions.
Figure 1C:
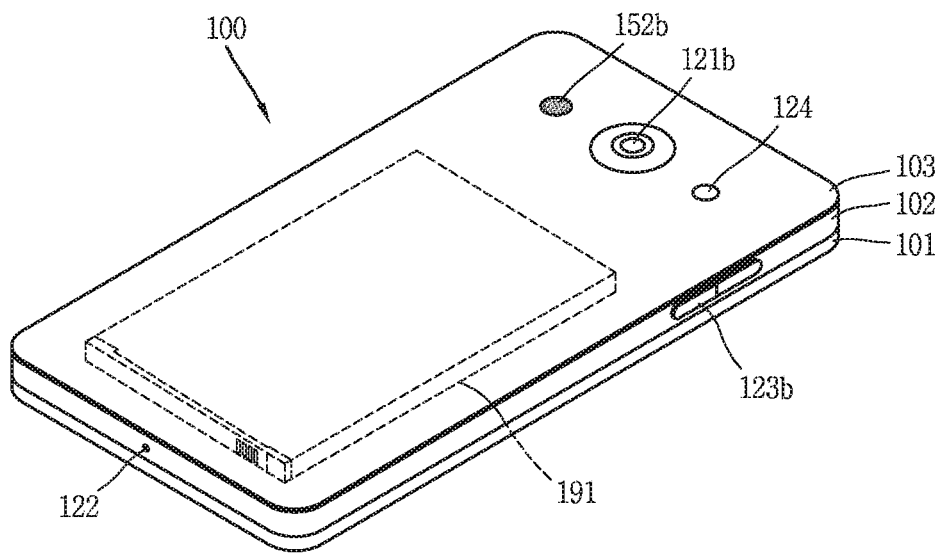

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

Meanwhile, the touch sensor may be configured to detect the touch input using different methods in the activated and deactivated states of the display unit 151. In this instance, the different method may be related to an activation period of the touch sensor. More specifically, the touch sensor may be activated at a different period according to whether the display unit 151 has been activated or not. That is, the touch sensor may have a different activation period according to whether the display unit 151 has been activated or not, and may sense a touch input applied thereto.

For instance, in a deactivated state of the display unit 151, the touch sensor may be activated with a preset period. In this instance, the preset period may be a time period more than 0. Further, in an activated state of the display unit 151, the touch sensor may be always operated in an activated state. I In this instance, an activation period of the touch sensor may be '0' or a value very close to '0'.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for touch inputs onto the display unit 151, while maintaining an activated state. Further, if the display unit 151 is in a deactivated state (hereinafter, will be referred to as a doze mode), the touch sensor may be activated at preset periods.

When the preset period of the touch sensor is shorter, a sensing speed with respect to touch inputs applied onto the display unit 151 is higher. However, in this instance, a power consumption amount of the touch sensor may be increased. In contrast, when the preset period of the touch sensor is longer, a sensing speed with respect to touch inputs applied onto the display unit 151 may be lower, while a power consumption amount of the touch sensor is decreased.

Thus, the preset period may be set so that a sensing speed with respect to taps applied onto the display unit 151 is high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a doze state and the touch sensor is periodically activated, if a preset touch input (e.g., a first touch input and a second touch input consecutively knocking-on a predetermined region within a predetermined time) is sensed by the touch sensor, the controller 180 can convert the doze mode into an active mode where the flexible display unit and the touch sensor are activated.

The touch sensor may be driven at a different period based on a state of the display unit 151. For instance, when the display unit 151 is in a closed state, a doze mode may be executed. Further, when a closed state is converted into an open state, an active mode may be executed.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 10, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 10, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch.

Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments related to a control method that can be implemented in a mobile terminal configured as above will be described with reference to the accompanying drawings. It will be apparent to those skilled in the art that the present invention may be embodied in other specific forms without departing from the spirit or essential characteristics thereof.

Hereinafter, the mobile terminal 100 according to the present invention will be described in detail with reference to FIG. 1A again.

Specifically, the wireless communication unit 110 performs communication with an external mobile photographing device. The external mobile photographing device refers to a device capable of capturing an image while moving. For example, it may be a drone equipped with a camera. The display unit 151 outputs a preview image captured by the camera 121 and detects a touch input for designating a capturing area (or capturing region) to be captured by the mobile photographing device.

The controller 180 controls the wireless communication unit 110 in a manner that capturing guide information calculated based on the capturing area is transmitted to the mobile photographing device and a preview image captured by the mobile photographing device according to the capturing guide information is received, in response to a touch input for designating the capturing area being applied to the preview image. In addition, the controller 180 controls the display unit 151 to output the preview image captured by the mobile photographing device.

FIG. 2 is a flowchart illustrating a representative control method of a mobile terminal according to the present invention.

Referring to FIG. 2, a preview image captured by the camera 121 is output on the display unit 151 (S210).

Subsequently, when a touch input for designating a capturing area (or a capturing region) to be captured by an external mobile photographing device is applied to the preview image, capturing guide information calculated based on the capturing area is transmitted to the mobile photographing device (S220).

Next, the preview image captured by the mobile photographing device according to the capturing guide information is received and output on the display unit 151 (S230).

As an embodiment, the step S220 may include calculating the capturing guide information based on the capturing area, in response to a multi-touch input for designating the capturing area being applied to the preview image captured by the camera 121.

Specifically, the step S220 may include setting the capturing area in a preset manner based on a multi-touch point to which the multi-touch input is applied.

As another embodiment, the step S220 may include calculating the capturing guide information based on the capturing area, in response to a pinch-in or pinch-out input designating the capturing area being applied to the preview image captured by the camera 121.

Specifically, the step S220 may include setting the capturing area to include the preview image based on a degree of the pinch-in input applied to the preview image.

Similarly, the step S220 may include setting the capturing area to be included in the preview image based on a degree of the pinch-out input applied to the preview image.

As another embodiment, the step S220 may include calculating the capturing guide information based on a capturing altitude (or height) of the mobile photographing device, in response to a user input for designating the capturing altitude being applied.

As another embodiment, the step S220 may include calculating the capturing guide information based on a capturing direction of the mobile photographing device, in response to a user input for designating the capturing direction being applied.

As another example, the step S230 may include outputting both of the preview image captured by the camera 121 and the preview image captured by the mobile photographing device according to the capturing guide information.

As another embodiment, the step S230 may further include changing a capturing setting value with respect to at least one of the preview image captured by the camera 121 and the preview image captured by the mobile photographing device according to the capturing guide information, in response to a preset touch input being applied.

The mobile terminal 100 according to the present invention may set a capturing area (size), a capturing altitude (or height), a capturing direction, a capturing setting value and the like to be captured by a drone camera (an external mobile photographing device), and accordingly, receive and output an image captured by the drone camera.

Hereinafter, detailed embodiments will be described with reference to the drawings.

On the other hand, the controller 180 may calculate the capturing guide information based on the capturing area, in response to a multi-touch input for designating the capturing area being applied to the preview image captured by the camera 121.

Specifically, the capturing area may be set in a preset manner based on a multi-touch point to which the multi-touch input has been applied.

Figure 3A:
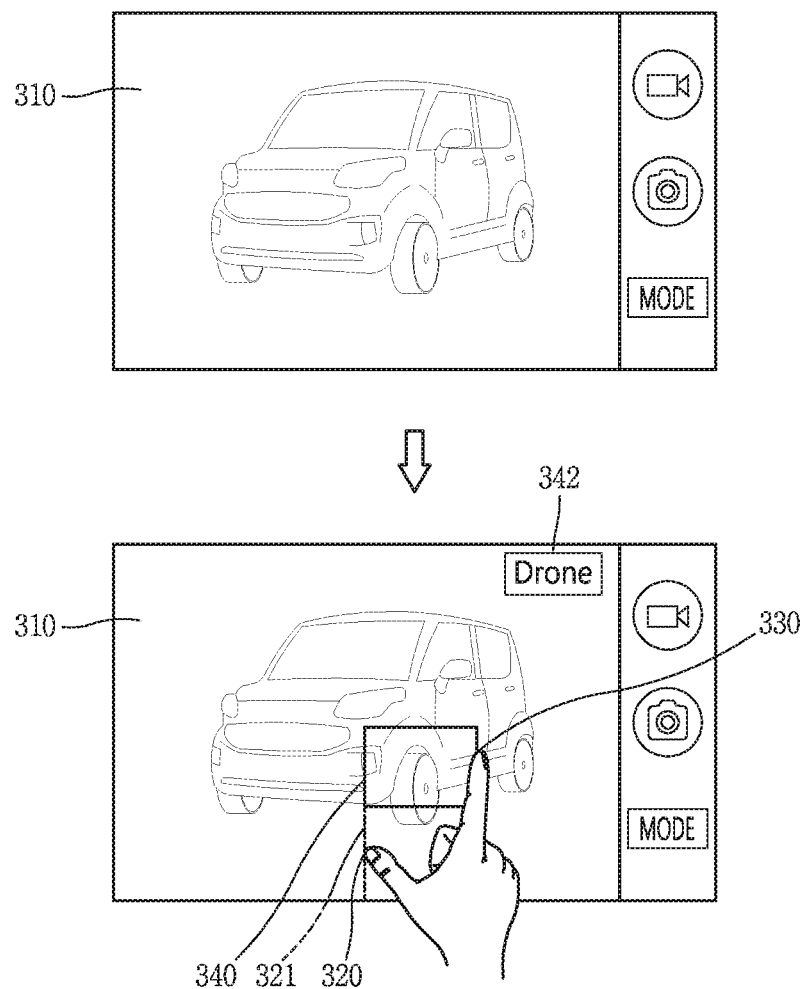
FIGS. 3A to 3C are conceptual views illustrating an embodiment for setting a size of a capturing area.
Figure 3B:
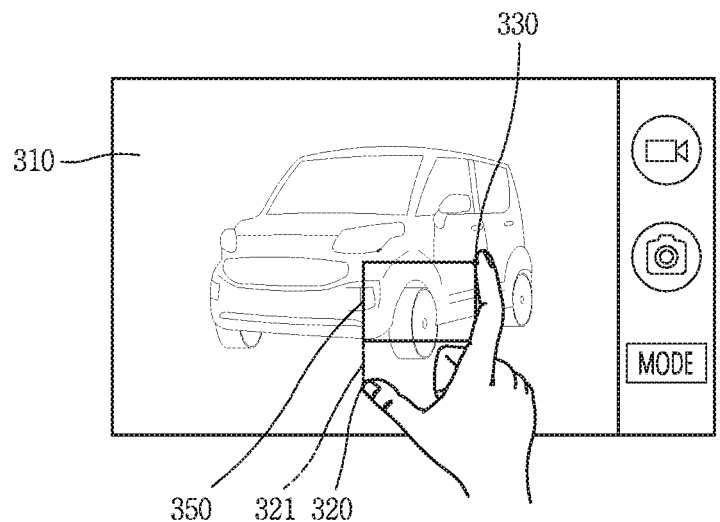
Figure 3C:
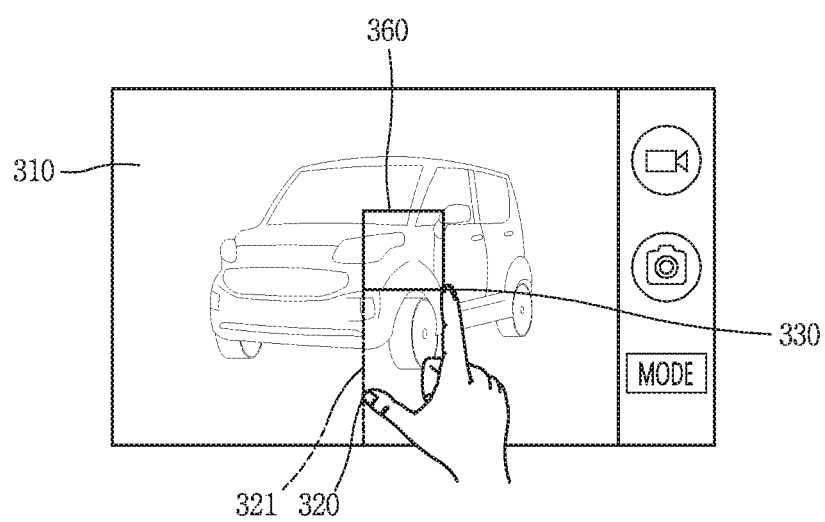

FIGS. 3A to 3C are conceptual views illustrating an embodiment of setting a size of a capturing area.

Referring to FIG. 3A, when the camera 121 is executed, a preview image 310 may be output on the display unit 151.

In this state, the user may simultaneously or sequentially touch a first point 320 and a second point 330 with fingers. Accordingly, a capturing area 340 to be captured by the drone camera may be output in a preset manner.

As an embodiment of the preset manner, the capturing area 340 (see FIG. 3) in which a part of a perpendicular extension line 321 to the first point 320 is one side and a perpendicular line including the second point 330 is another side facing the one side may be output. According to this method, the capturing area can be set while minimizing an area veiled by the user's fingers. Further, as the capturing area is output, an icon 342 corresponding to the drone camera may be output.

As another embodiment, referring to FIG. 3B, in the state in which the preview image 310 is being output, a user may simultaneously or sequentially touch the first point 320 and the second point 330 with the fingers. Accordingly, a capturing area 350 in which a part of the perpendicular extension line 321 to the first point 320 is one side and the second point 330 is an upper corner of another side facing the one side may be output.

As another embodiment, referring to FIG. 3C, in the state where the preview image 310 is being output, the user may simultaneously or sequentially touch the first point 320 and the second point 330 with the fingers. Thus, a capturing area 360 in which a part of the perpendicular extension line 321 to the first point 320 is one side and the second point 330 is a lower corner of another side facing the one side may be output.

FIGS. 4A to 4D are conceptual views illustrating another embodiment of setting a size of a capturing area.

Figure 4A:
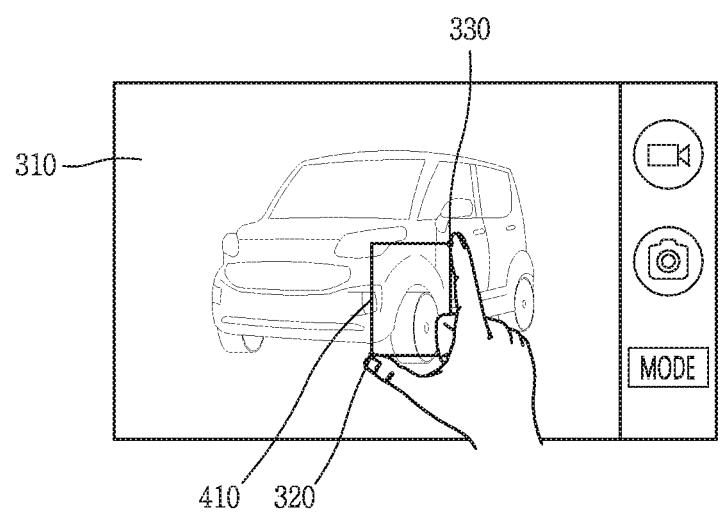
FIGS. 4A to 4D are conceptual views illustrating another embodiment of setting a size of a capturing area.

Referring to FIG. 4A, in the state where the preview image 310 is being output, the user may simultaneously or sequentially touch the first point 320 and the second point 330 with the fingers. Accordingly, a capturing area 410 having the first point 320 and the second point 330 as corners facing each other may be output.

Figure 4B:
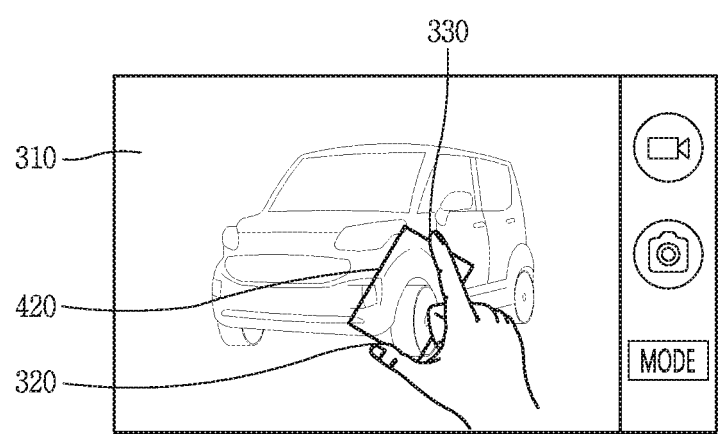

As another embodiment, referring to FIG. 4B, in the state in which the preview image 310 is being output, the user may simultaneously or sequentially touch the first point 320 and the second point 330 with the fingers. Accordingly, a capturing area 420 having a center located on a line connecting the first point 320 and the second point 330 may be output.

Figure 4C:
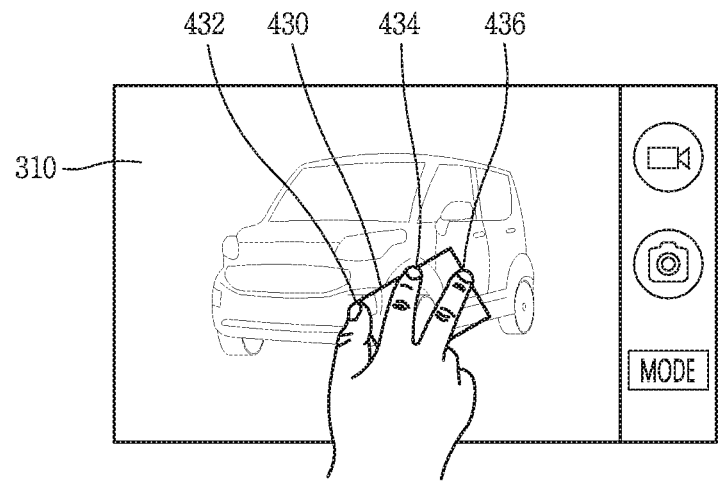

As another embodiment, referring to FIG. 4C, in the state in which the preview image 310 is being output, the user may simultaneously or simultaneously display a third point 432, a fourth point 434, and a fifth point 436 with fingers. Accordingly, a capturing area 430 having lines including the third point 432, the fourth point 434, and the fifth point 436 as three sides may be output.

Figure 4D:
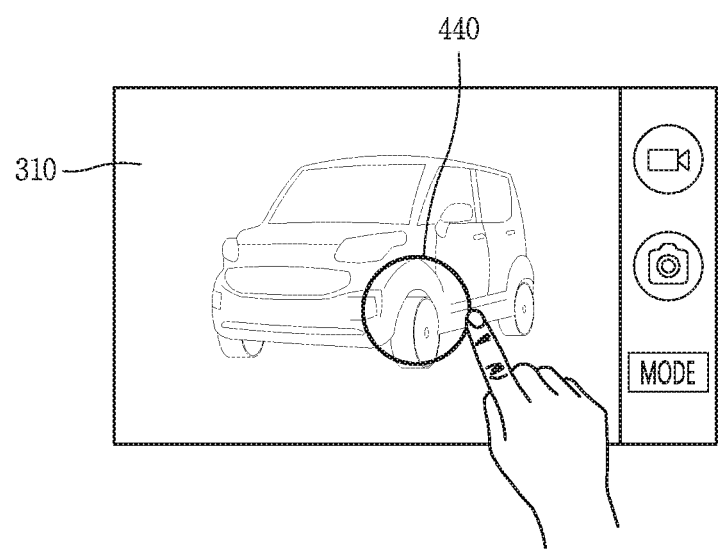

As another embodiment, referring to FIG. 4D, in the state where the preview image 310 is being output, the user may select one area by applying a touch input of drawing the one area with a finger. Accordingly, the one area may be output as a capturing area 440.

On the other hand, a size, a position or the like of the capturing area may be changed by applying a preset touch input or gesture.

FIGS. 5A to 5E are conceptual views illustrating an embodiment for changing a capturing area.

Referring to FIG. 5A, in the state illustrated in FIG. 4A, the user may make a gesture 412 of moving a hand to right while maintaining the touches.

Accordingly, the finger touching the first point 320 touches a 1-$a^{th}$ point 322 and the finger touching the second point 330 touches a 2-$a^{th}$ point 332. Further, a capturing area 510 moved to the right can be output.

Figure 5B:
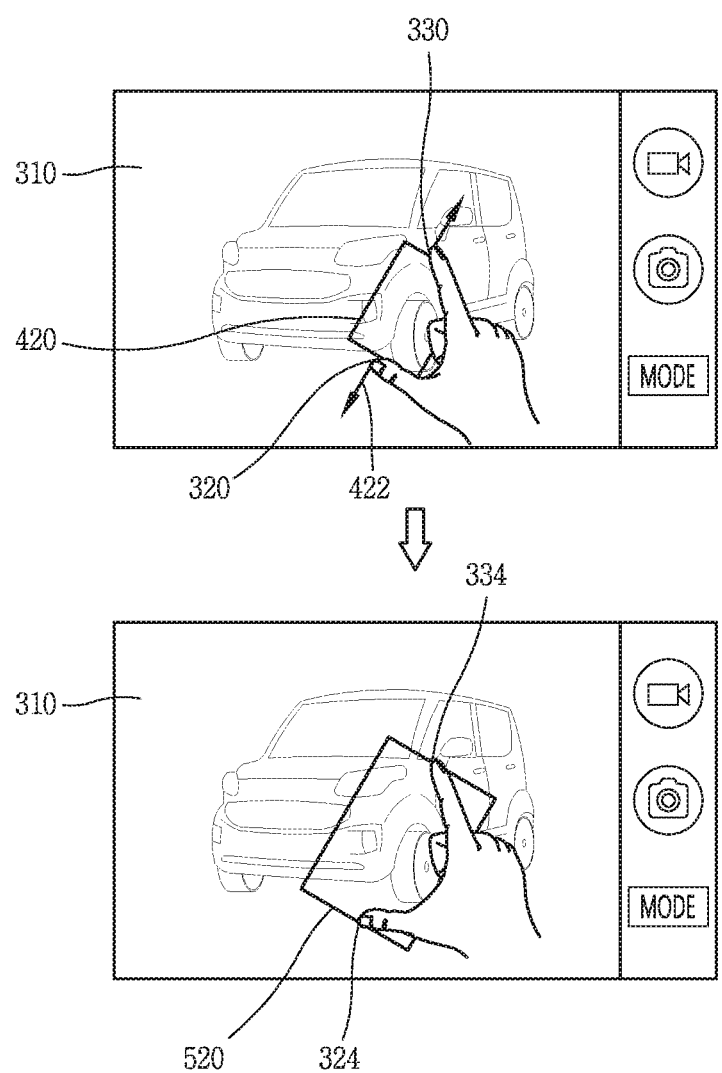

As another embodiment, referring to FIG. 5B, in the state illustrated in FIG. 4B, a pinch-out input 422 may be applied. Accordingly, the finger touching the first point 320 touches a 1-$b^{th}$ point 324 and the finger touching the second point 330 touches a 2-$b^{th}$ point 334. Also, a capturing area 520 with an increased size may be output according to a degree of the pinch-out input 422.

Figure 5C:
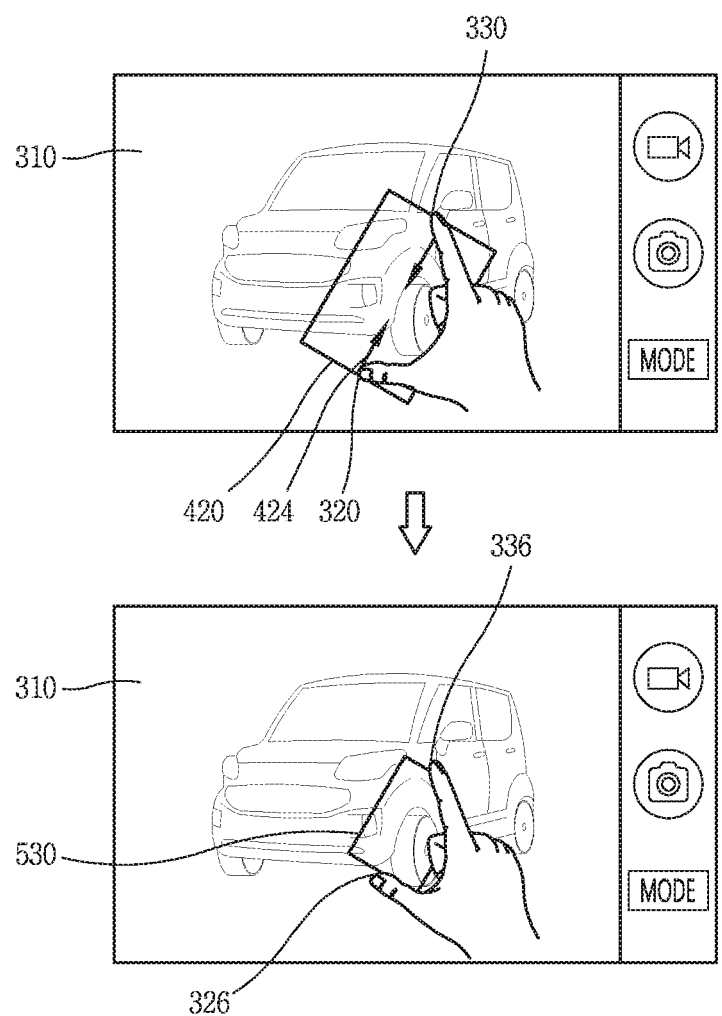

As another embodiment, referring to FIG. 5C, in the state illustrated in FIG. 4B, a pinch-in input 424 may be applied. Thus, the finger touching the first point 320 touches a 1-$c^{th}$ point 326 and the finger touching the second point 330 touches a 2-$c^{th}$ point 336. Further, a capturing area 530 with a reduced size may be output according to a degree of the pinch-in input 424.

Figure 5D:
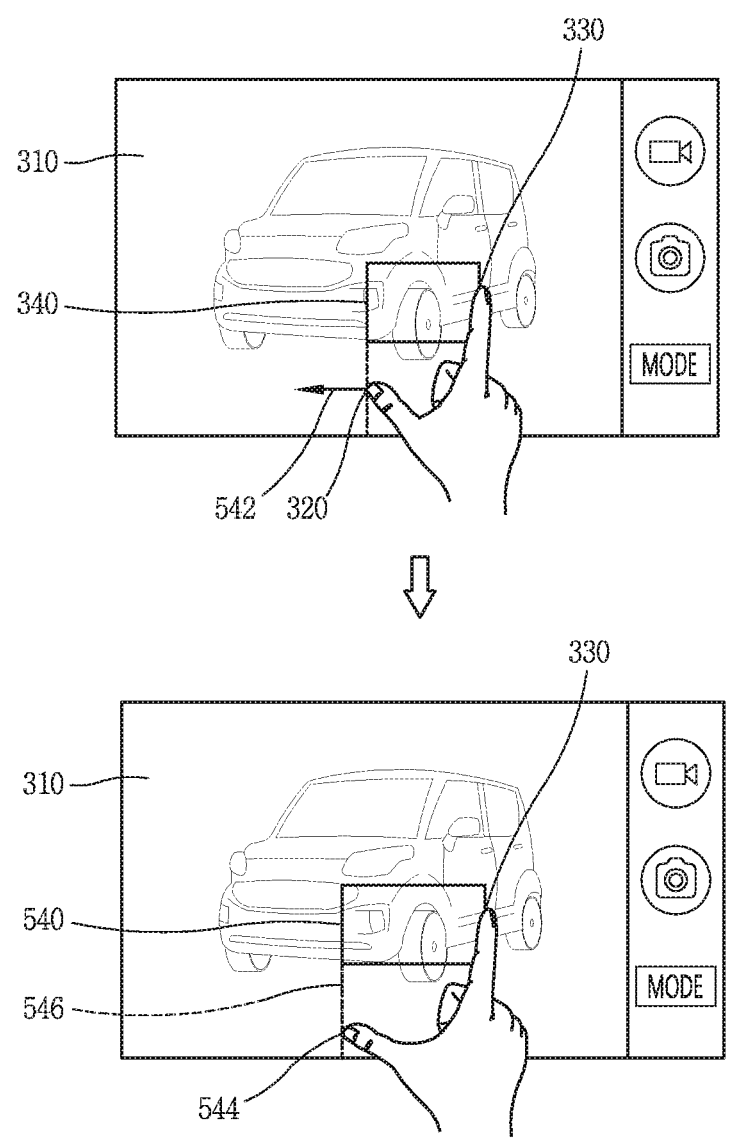

As another embodiment, referring to FIG. 5D, in the state illustrated in FIG. 3A, a gesture 542 of spreading (moving) outward the finger touching the first point 320 may be applied.

Accordingly, the finger touching the first point 320 touches a 1-$d^{th}$ point 544, and a capturing area 540, in which a part of a perpendicular extension line 546 to the 1-$d^{th}$ point 544 is one side and a perpendicular line including the second point 330 is another side facing the one side, may be output. That is, a capturing area 540 with an increased size may be output according to a degree of spreading (moving) outward the finger touching the first point 320.

Figure 5E:
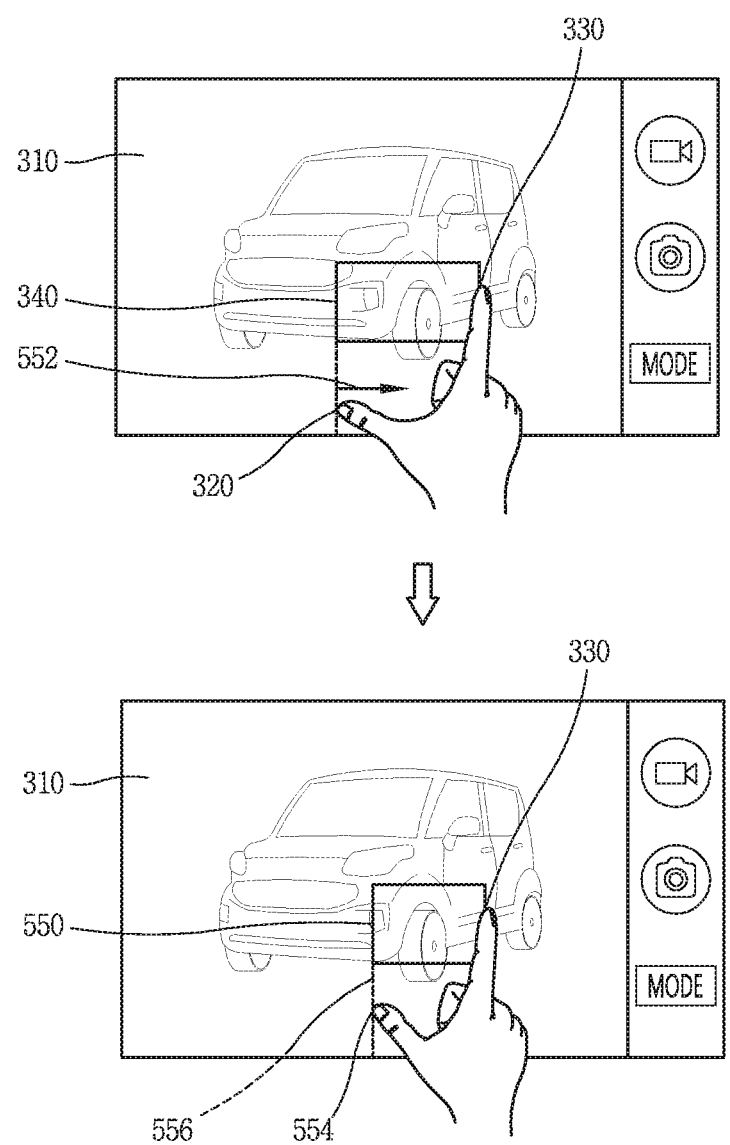

As another embodiment, referring to FIG. 5E, in the state illustrated in FIG. 3A, a gesture 552 of pulling (moving) inward the finger touching the first finger 320 may be applied.

Accordingly, the finger touching the first point 320 touches a 1-$e^{th}$ point 554, and a capturing area 550, in which a part of a perpendicular extension line 556 to the 1-$e^{th}$ point 554 is one side and a perpendicular line including the second point 330 is another side facing the one side, may be output. That is, a capturing area 550 with a reduced size may be output according to a degree of pulling (moving) inward the finger touching the first point 320.

On the other hand, the controller 180 may calculate the capturing guide information based on the capturing area, in response to a pinch-in or pinch-out input designating the capturing area being applied to the preview image captured by the camera 121.

Specifically, the capturing area may be set to include the preview image based on a degree of the pinch-in input applied to the preview image. In addition, the capturing area may be set to be included in the preview image based on a degree of the pinch-out input applied to the preview image.

Figure 6:
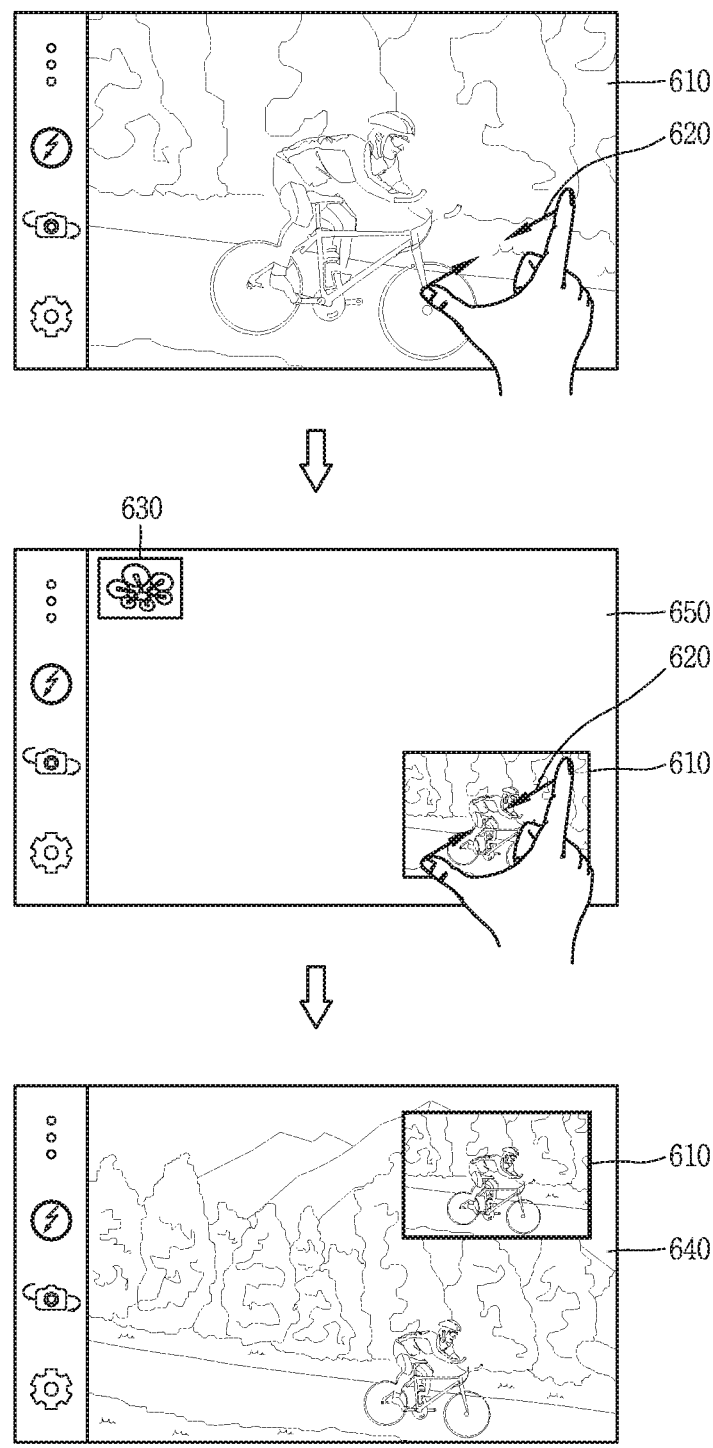
FIG. 6 is a conceptual view illustrating an embodiment for setting a capturing area with a pinch-in input.

FIG. 6 is a conceptual view illustrating an embodiment for setting a capturing area with a pinch-in input.

Referring to FIG. 6, when the camera 121 is executed, a preview image 610 may be output on the display unit 151. In this state, the user may apply a pinch-in input 620 to one area of a screen 151.

Accordingly, the preview image 610 is reduced around the one area to which the pinch-in input 620 has been applied, and an area 650 without an image is output on the screen 151. Also, the drone camera may be activated and an icon 630 of the drone camera may be displayed on the screen 151.

Then, when the fingers applying the pinch-in input 620 are released, the activated drone camera receives capturing guide information indicating a capturing area 640 to be captured. Specifically, the capturing area 640 may be set such that an image is output on an area 650 which appears due to the reduction of the image 610 and does not output an image thereon. That is, the capturing area 640 may include the reduced preview image 610.

Then, an image captured by the drone camera according to the capturing guide information may be received and output. More specifically, the capturing area 640 captured by the drone camera may be output on the entire screen 151, and a preview image 610 captured by the camera 121 of the mobile terminal 100 may be output on one area of the screen 151.

According to the embodiment of FIG. 6, a person may be captured with the camera 121 of the mobile terminal 100, and a background around the person may be captured with the drone camera. That is, the user may input the pinch-in input 620 to set a background area around the person to be captured by the drone camera.

Figure 7:
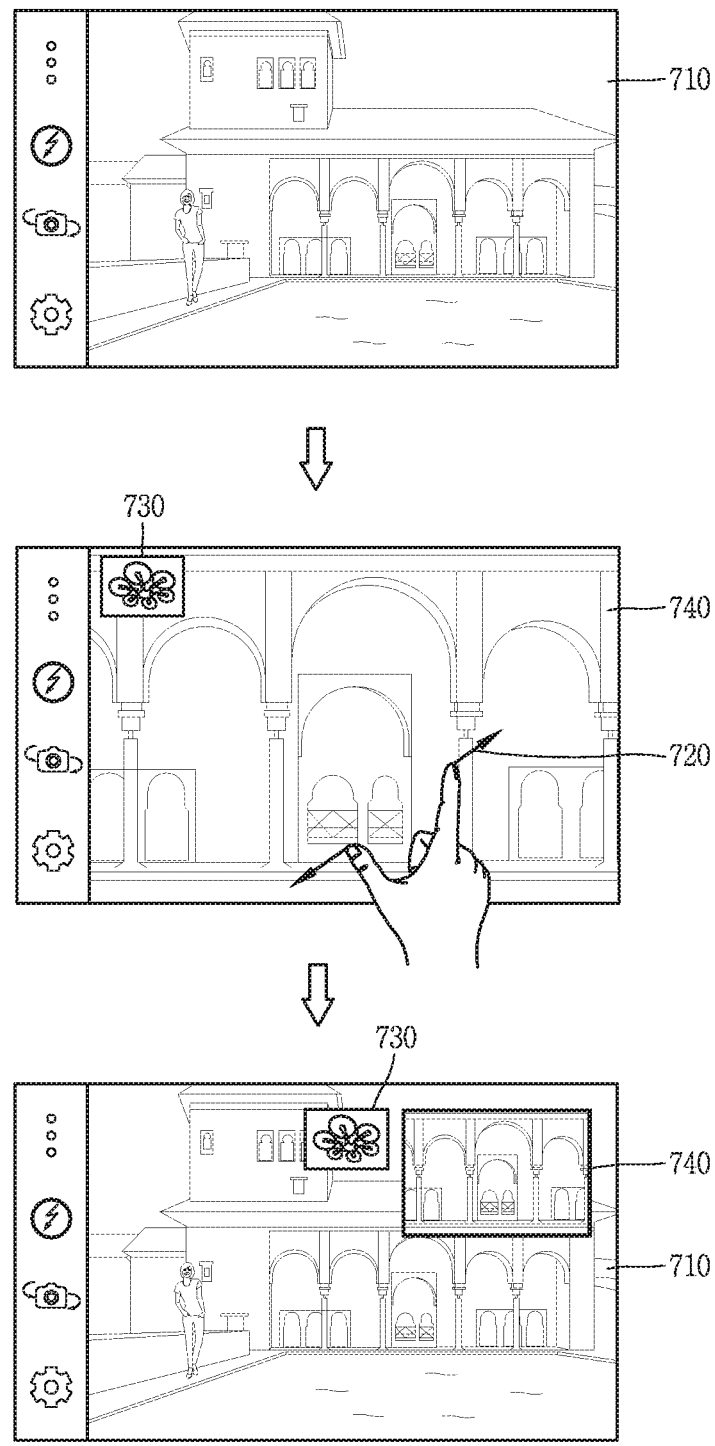
FIG. 7 is a conceptual view illustrating an embodiment for setting a capturing area with a pinch-out input.

FIG. 7 is a conceptual view illustrating an embodiment for setting a capturing area with a pinch-out input.

Referring to FIG. 7, when the camera 121 is executed, a preview image 710 may be output on the display unit 151. In this state, the user may apply a pinch-out input 720 to one area of the screen 151.

Accordingly, the camera 121 zooms in on the one area to which the pinch-out input 720 has been applied, and a preview image 740 in which the one area has been enlarged is output. Also, the drone camera may be activated and an icon 730 of the drone camera may be displayed on the screen 151.

Then, when fingers applying the pinch-out input 720 are released, the activated drone camera receives capturing guide information indicating the capturing area 740 to be captured. Specifically, the capturing area 740 may be set to the preview image in which the one area has been enlarged. That is, the capturing area 740 may be included in the preview image 710.

Then, an image captured by the drone camera according to the capturing guide information may be received and output. More specifically, the capturing area 740 captured by the drone camera may be output on the one area of the screen 151, and the preview image 710 captured by the camera 121 of the mobile terminal 100 may be output on the entire screen 151.

According to the embodiment of FIG. 7, a wide area including a background may be captured by the camera 121 of the mobile terminal 100, and a specific area located far from the mobile terminal 100 may be captured in detail by the drone camera. That is, the user may apply the pinch-out input 720 to set the specific area to be captured by the drone camera in an enlarging manner.

Figure 8:
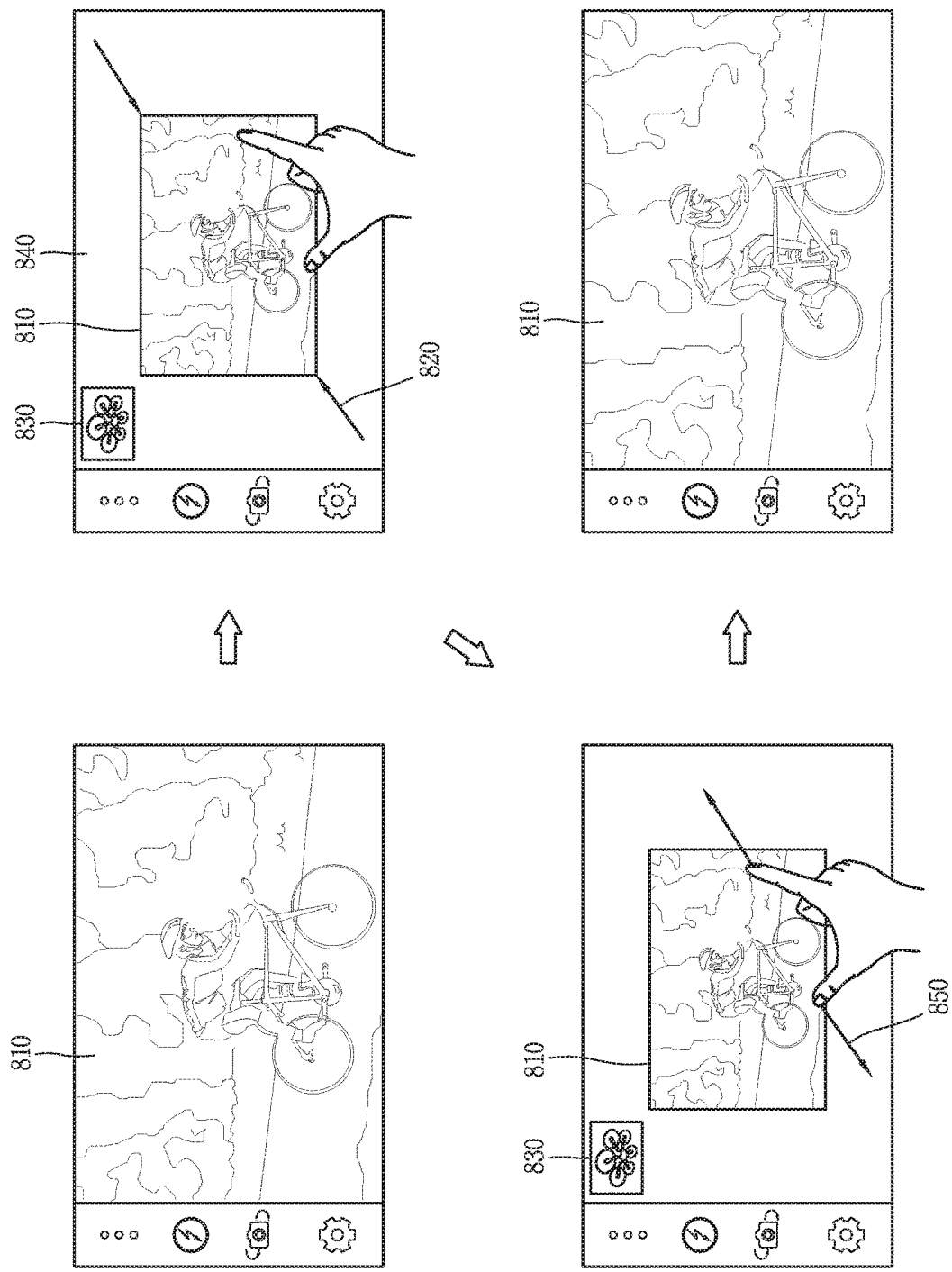
FIG. 8 is a conceptual view illustrating an embodiment of adjusting a size of a capturing area.

FIG. 8 is a conceptual view illustrating an embodiment of adjusting a size of a capturing area.

Referring to FIG. 8, as described with reference to FIG. 6, in a state where a preview image 810 is being output on the display unit 151, the user may apply a pinch-in input 820 to one area of the screen 151. Alternatively, the user may apply an input using a scroll bar.

Accordingly, the preview image 810 is reduced around a central area of the screen 151, and an area 840 on which any image is not output appears on the screen 151. Also, the drone camera may be activated and an icon 830 of the drone camera may be displayed on the screen 151. At this time, a capturing area may be set such that an image is output on the area 840 which appears due to the reduction of the preview image 810 and any image is not output thereon.

In this state, when the user applies a pinch-out input 850, the drone camera may be deactivated and the initial preview image 810 may be output again on the entire screen 151.

In another embodiment, the user may apply a pinch-out input to adjust a size of a capturing area to be captured by the drone camera. For example, when a pinch-out input is applied, a background area around a person to be captured by the drone camera is reduced.

Figure 9:
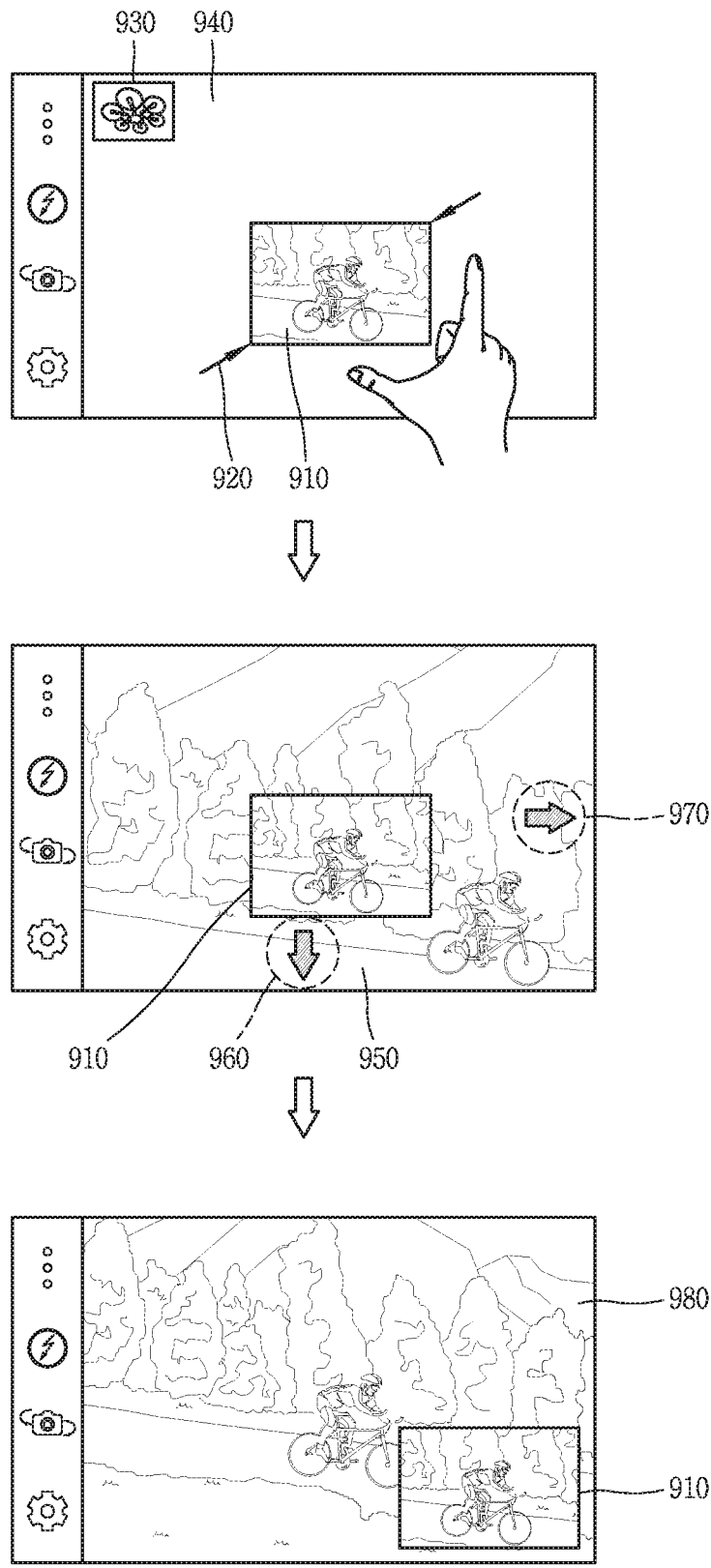
FIG. 9 is a conceptual view illustrating an embodiment in which a moving direction of a drone camera is output according to capturing guide information.

FIG. 9 is a conceptual view illustrating an embodiment in which a moving direction of a drone camera is output according to capturing guide information.

Referring to FIG. 9, as described with reference to FIG. 6, in a state where a preview image is being output on the display unit 151, the user may apply a pinch-in input 920 to one area of the screen 151.

Accordingly, the preview image 910 is reduced around the one area to which the pinch-in input 920 has been applied, and an area 940 without an image is output on the screen 151. Also, the drone camera may be activated and an icon 930 of the drone camera may be displayed on the screen 151.

Then, when fingers applying the pinch-in input 920 are released, the activated drone camera receives capturing guide information indicating the capturing area to be captured. Specifically, the capturing area may be set such that an image is output on the area 940 which appears due to the reduction of the preview image 910 and any image is not output thereon. In other words, the reduced preview image 910 may be included in the capturing area.

Next, an image currently captured by the drone camera may be received and output. Specifically, the reduced preview image 910 is output as an upper layer on the one area of the screen 151, and a preview image 950, which is captured according to the current position of the drone camera, may be output as a lower layer.

In addition, information indicating a direction in which the drone camera should move according to capturing guide information may be output. For example, arrows 960 and 970 indicating the direction in which the drone camera is to move may be output.

Then, an image captured by the drone camera according to the capturing guide information may be received and output. More specifically, a capturing area 980 captured by the drone camera may be output on the entire screen 151, and the preview image 910 captured by the camera 121 of the mobile terminal 100 may be output on the one area of the screen 151.

As another embodiment, only the capturing area 980, which is captured by the drone camera, may be output on the entire screen 151. Alternatively, a position where the preview image 910 captured by the camera 121 of the mobile terminal 100 is output may be set. For example, a drag input may be applied to the preview image 910 with three fingers to drag the preview image 910 to a desired position.

Figure 10A:
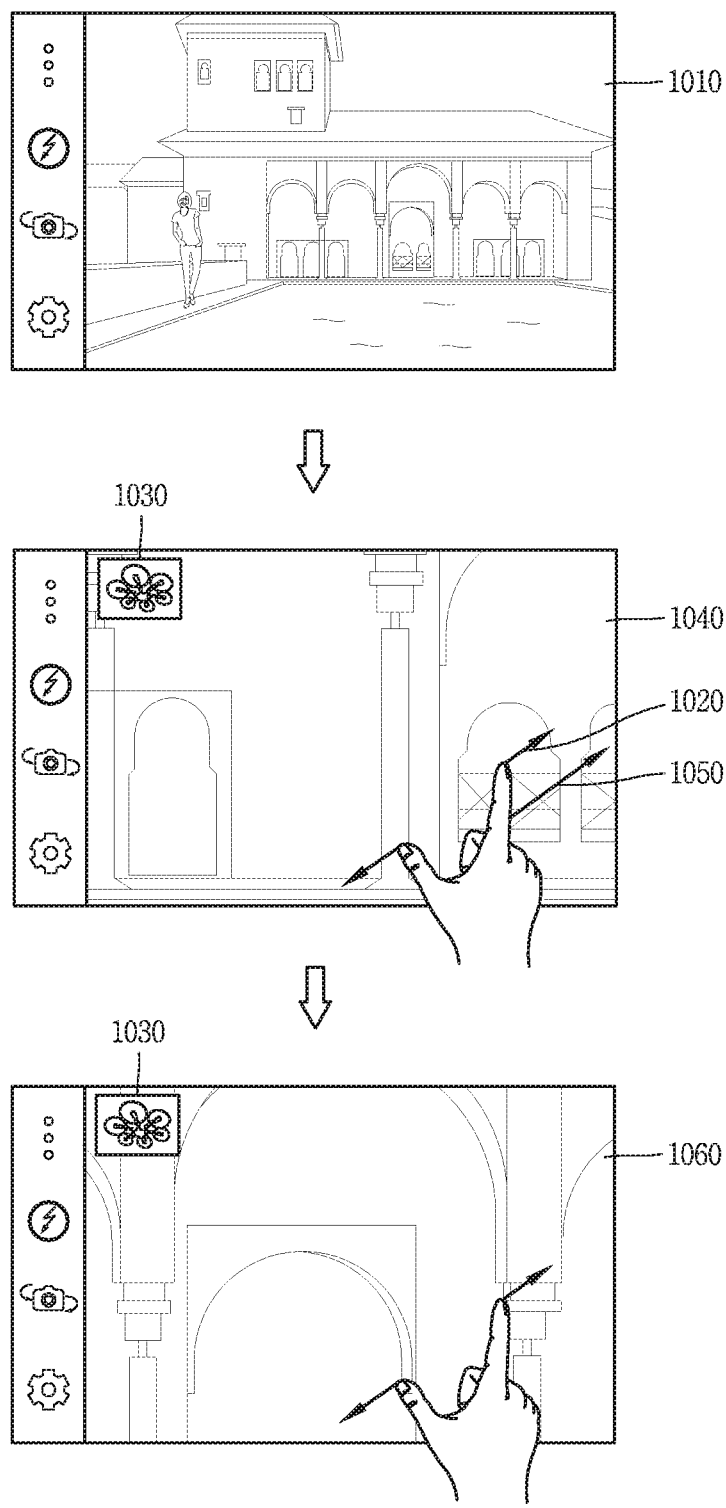
FIGS. 10A and 10B are conceptual views illustrating another embodiment of changing a capturing area.
Figure 10B:
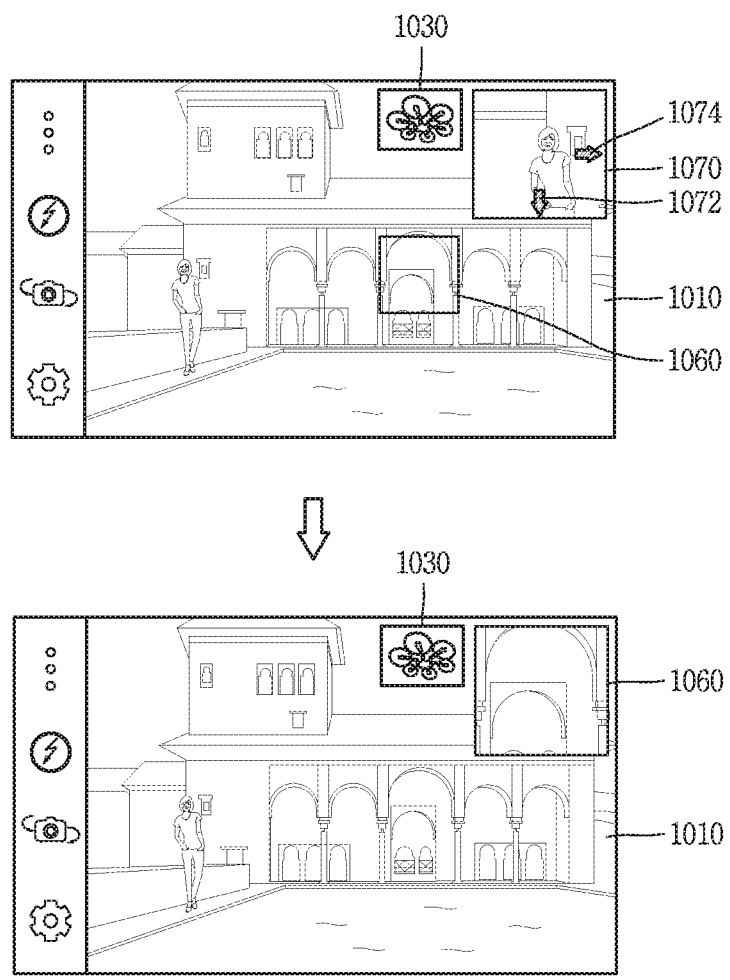

FIGS. 10A and 10B are conceptual views illustrating another embodiment of changing a capturing area.

Referring to FIG. 10A, in a state where a preview image 1010 is output on the display unit 151, the user may apply a pinch-out input 1020 to one area of the screen 151.

Accordingly, the camera 121 zooms in on the one area to which the pinch-out input 1020 has been applied, and thus a first preview image 1040 in which the one area has been enlarged may be output. Also, the drone camera may be activated and an icon 1030 of the drone camera may be displayed on the screen 151.

As another embodiment, the user may output the first preview image 1040 with the enlarged one area by using a scroll bar. Then, a boundary (outline) of the entire screen 151 may be output with a bold line or a different color, to indicate the image 1040 with the enlarged one area.

At this time, the area to be enlarged in the preview image 1010 may be selected by applying an input 1050 which is dragged while maintaining a distance between fingers applying the pint-out input 1020.

For example, when the drag input 1050 is applied in one direction while maintaining the distance between the fingers applying the pinch-out input 1020, a second preview image 1060 in which one area of the preview image 1010 has been enlarged is output. The second preview image 1060 has the same enlargement ratio as that of the first preview image 1040. The second preview image 1060 may be an image, which is obtained by capturing an area located in one direction of the preview image 1040 by an applied degree of the drag input 1050.

That is, the enlargement ratio of the preview image 1010 may be set according to the degree of the pinch-out input 1020 (the distance between the fingers), and the area to be enlarged may be set according to the degree of the drag input 1050 (a distance of moving a hand while maintaining the distance between the fingers).

As another embodiment, referring to FIG. 10B, when the fingers applying the pinch-out input are released, the activated drone camera receives capturing guide information indicating a capturing area 1060 to be captured.

In addition, an image 1070 currently captured by the drone camera may be output on one area of the screen 151. At this time, information indicating a direction in which the drone camera is to move based on the capturing guide information may be output. For example, arrows 1072 and 1074 indicating the direction in which the drone camera is to move may be output. The capturing area 1060 to be captured by the drone camera may be displayed on the preview image 1010 captured by the camera 121.

Then, when the drone camera moves according to the capturing guide information, the arrows 1072 and 1074 indicating the moving direction of the drone camera disappear. In addition, an image captured by the drone camera according to the capturing guide information may be received and output. More specifically, the capturing area 1060 captured by the drone camera may be output on the one area of the screen 151, and the preview image 1010 captured by the camera 121 of the mobile terminal 100 may be output on the entire screen 151.

According to the embodiment, the user can capture a specific area far away in detail in a great size using the drone camera during capturing with the camera 121 of the mobile terminal.

In another embodiment, as described with reference to FIG. 4D, the capture area 1060 may be selected by applying a touch input of drawing one area on the preview image 1010 with a finger.

As another embodiment, the user may capture a specific area far away in detail in a great size using the camera 121 of the mobile terminal 100 during capturing with the drone camera.

A detailed method is similar to that illustrated in FIGS. 10A and 10B. First, a specific area of a preview image of the drone camera which is being output on the screen 151 may be selected. For example, as described with reference to FIG. 4D, a specific area may be selected by applying a touch input that draws one area with a finger.

Accordingly, after the camera 121 of the mobile terminal 100 is activated, the user may capture the specific area in a zoom-in manner. Also, position guide information related to the mobile terminal 100 for capturing the specific area may be output. For example, a direction in which the user is to move, or the like may be output.

On the other hand, the controller 180 may calculate the capturing guide information based on a capturing altitude (or height) of the mobile photographing device (drone camera), in response to a user input for designating the capturing altitude being applied.

Figure 11:
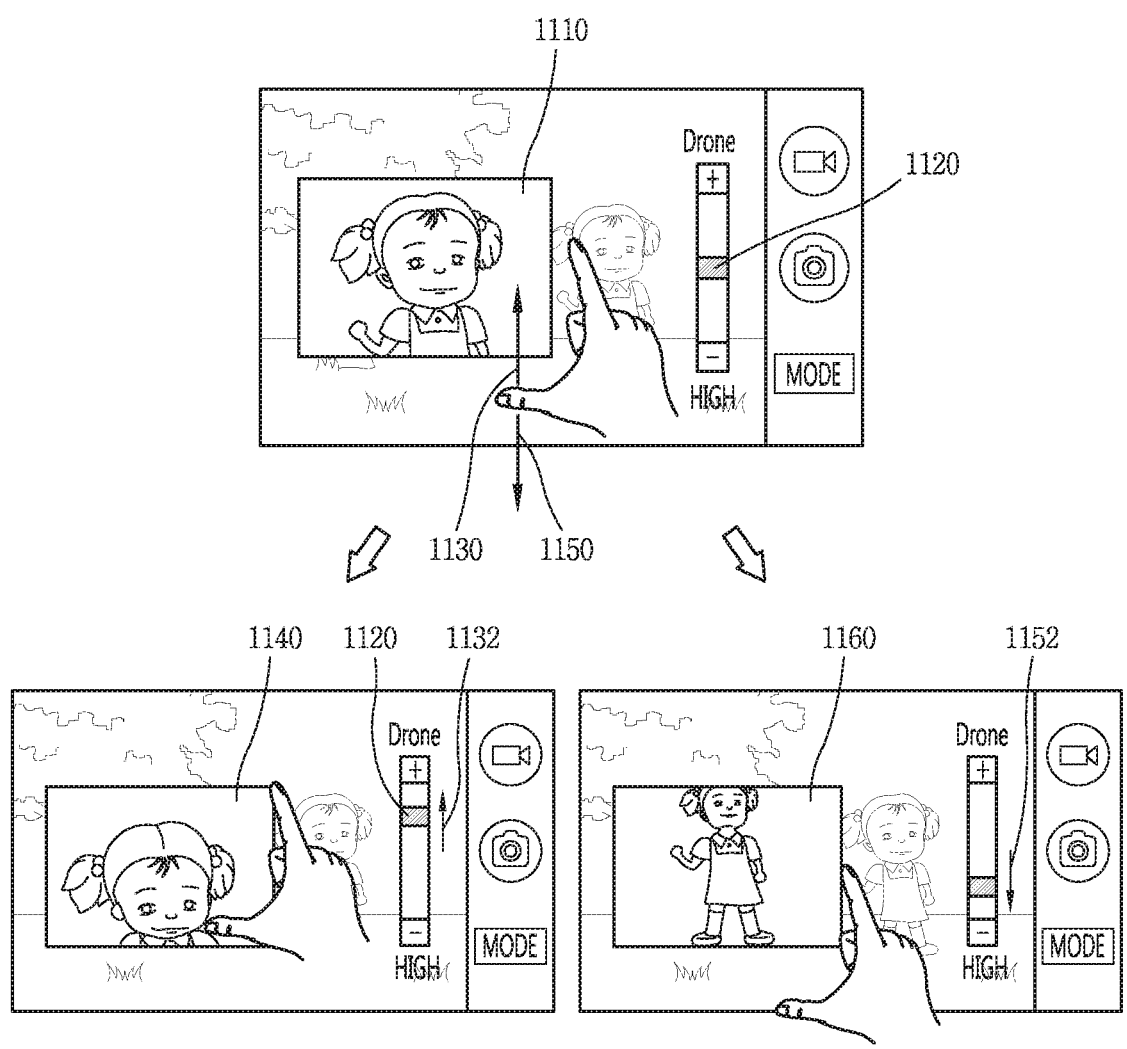
FIG. 11 is a conceptual view illustrating an embodiment of setting a capturing height (altitude).

FIG. 11 is a conceptual view illustrating an embodiment of setting a capturing altitude (height).

Referring to FIG. 11, when two fingers are not released for a predetermined time after setting a capturing area with the two fingers according to one of the foregoing embodiments, a selected capturing area 1110 may be output.

In addition, a status bar 1120 indicating the capturing altitude of the drone camera may be output. At this time, an initial capturing altitude may be set to almost the same degree as the capturing altitude of the camera 121 of the mobile terminal 100.

Then, the user may apply a drag input 1130 upward while maintaining a distance between the fingers currently touching the screen 151. The capturing altitude of the drone camera is increased to correspond to a degree of the drag input 1130, and the status bar 1120 indicating the capturing altitude of the drone camera is also moved upward (1132).

Then, a capturing area 1140 in which the capturing altitude has been increased to correspond to the degree of the drag input 1130 may be output. The capturing area 1140 in which the capturing altitude has been increased may be captured by tilting upward the camera 121 of the mobile terminal 100.

Similarly, the user may apply a drag input 1150 downward while maintaining the distance between the fingers currently touching the screen 151. The capturing altitude of the drone camera is decreased to correspond to a degree of the drag input 1150, and the state bar 1120 indicating the capturing altitude of the drone camera is also moved downward (1152).

Then, a capturing area 1160 in which the capturing altitude is decreased to correspond to a degree of the drag input 1150 may be output. The capturing area 1160 in which the capturing altitude has been decreased may be captured by tilting downward the camera 121 of the mobile terminal 100.

As another embodiment, a capturing altitude may be adjusted by releasing the two fingers and then applying a touch input with one finger after outputting the status bar 1120 for adjusting the selected capturing area 1110 and the capturing altitude. Specifically, the capturing altitude may be increased or decreased by applying a drag input upward or downward after applying a touch input to one area of the screen 151. Alternatively, the capturing altitude may be increased or decreased by applying a drag input upward or downward directly to the status bar 1120.

As another embodiment, an aerial view or a sky-view image corresponding to the selected capturing area 1110 may be output in place of or in addition to the selected capturing area 1110. The process of setting the capturing altitude may be similar to the foregoing embodiment.

As another embodiment, a three-dimensional (3D) image showing an altitude changing process (effect) may be output simultaneously or sequentially when a user input for changing the capturing altitude is applied.

On the other hand, the controller 180 may calculate the capturing guide information based on a capturing direction of the mobile photographing device (drone camera), in response to a user input for designating the capturing direction being applied.

Figure 12:
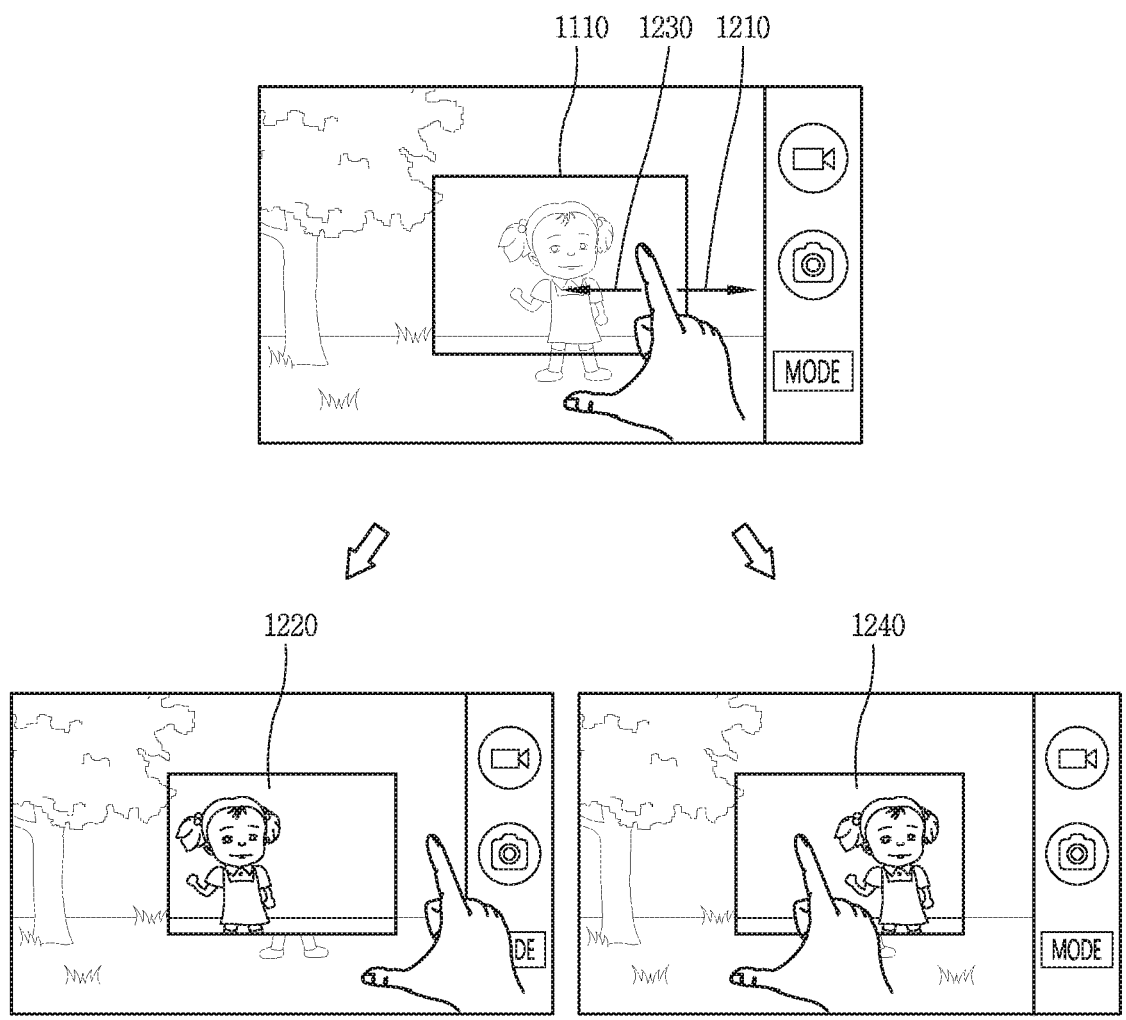
FIG. 12 is a conceptual view illustrating an embodiment for setting a capturing direction.

FIG. 12 is a conceptual view illustrating an embodiment for setting a capturing direction.

Referring to FIG. 12, the selected capturing area 1110 may be output when two fingers are not released for a predetermined time after setting the capturing area or the capturing area and the capturing altitude with the two fingers according to one of the foregoing embodiments.

Then, the user may apply a drag input 1210 to right while maintaining the distance between the fingers currently touching the screen 151. A capturing direction of the drone camera is moved to right to correspond to a degree of the drag input 1210.

At this time, the capturing direction of the drone camera may be moved to right based on a preset point of the selected capturing area 1110. For example, the capturing direction of the drone camera may be moved based on a central point or a focal point of the capturing area 1110.

Then, a capturing area 1220 in which the capturing direction has been moved may be output to correspond to a degree of the drag input 1210. The capturing area 1220 in which the capturing direction has been moved may be captured by tilting to right the camera 121 of the mobile terminal 100.

Similarly, the user may apply a drag input 1230 to left while maintaining the distance between the fingers currently touching the screen 151. The capturing direction of the drone camera may be moved to left to correspond to a degree of the drag input 1230.

At this time, the capturing direction of the drone camera may be moved to left based on a preset point of the selected capturing area 1110. For example, the capturing direction of the drone camera may be moved based on a central point or a focal point of the capturing area 1110.

Then, a capturing area 1240 in which the capturing direction has been moved may be output to correspond to the degree of the drag input 1230. The capturing area 1240 in which the capturing direction has been moved may be captured by tilting to left the camera 121 of the mobile terminal 100.

In another embodiment, the capturing altitude may be adjusted by releasing the two fingers and then applying a touch input with one finger after the selected capturing area 1110 is output. Specifically, the capturing direction may be moved to right or left by applying a drag input to right or left after touching one area of the screen 151.

As another embodiment, an aerial view or a sky-view image corresponding to the selected capturing area 1110 may be output in place of or in addition to the selected capturing area 1110. The process of setting the capturing direction may be similar to the foregoing embodiment.

As another embodiment, a status bar (not illustrated) indicating a capturing direction, similar to the status bar 1120 indicating the capturing altitude of the drone camera, may be output. The user may set the capturing direction by directly applying a drag input to the status bar.

As another embodiment, a three-dimensional (3D) image showing the capturing direction changing process (effect) may be output simultaneously or sequentially when a user input for changing the capturing direction is applied.

Figure 13B:
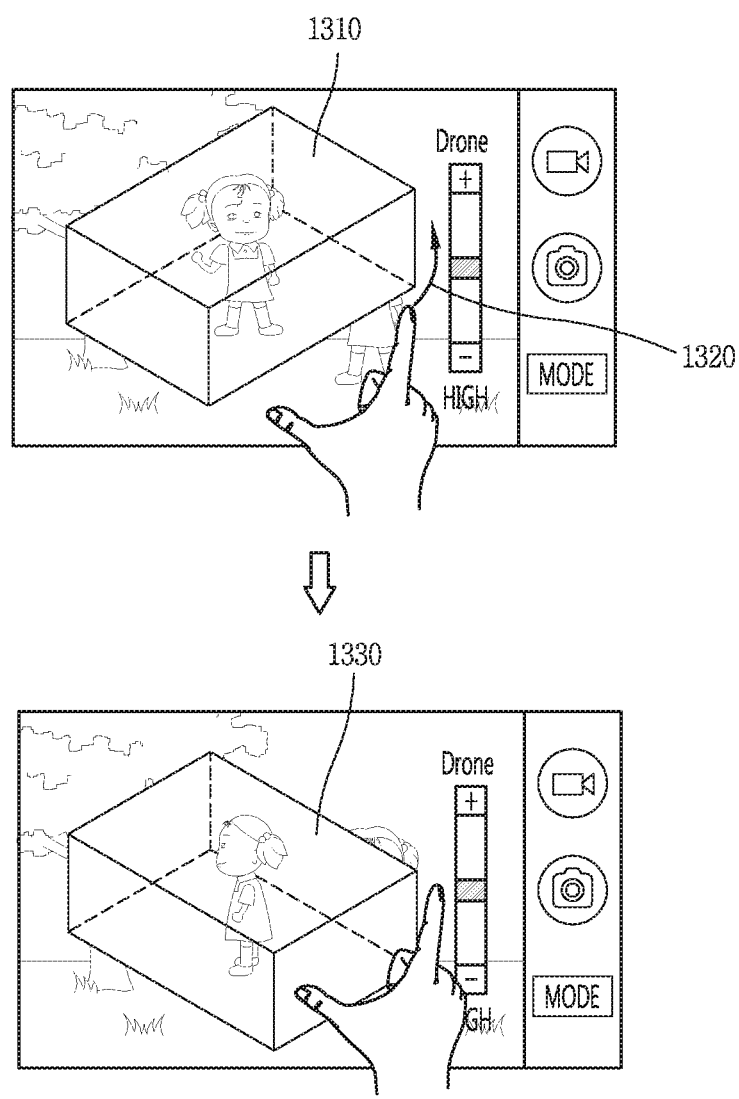

FIGS. 13A and 13B are conceptual views illustrating an embodiment of setting a capturing altitude and a capturing direction using a 3D image.

Referring to FIG. 13A, a 3D image 1340 showing a capturing altitude may be output when two fingers are not released for a predetermined time after setting a capturing area with the two fingers according to one of the foregoing embodiments.

In addition, a status bar 1350 indicating the capturing altitude of the drone camera may be output. At this time, an initial capturing altitude may be set to almost the same degree as the capturing altitude of the camera 121 of the mobile terminal 100.

Then, the user may apply a drag input 1360 upward while maintaining a distance between the fingers currently touching the screen 151. The capturing altitude of the drone camera is increased to correspond to a degree of the drag input 1360, and the status bar 1350 indicating the capturing altitude of the drone camera is also moved upward (1380). Then, a 3D image 1370 with an increased capturing altitude may be output to correspond to the degree of the drag input 1360.

As another embodiment, the capturing altitude may be adjusted by releasing the two fingers and then applying a touch input with one finger. Specifically, the capturing altitude may be increased or decreased by applying a drag input upward or downward after applying a touch input to one area of the screen 151. Alternatively, the capturing altitude may be increased or decreased by applying a drag input upward or downward directly to the status bar 1350. As a result, a 3D image with an increased or decreased capturing altitude may be output.

As another embodiment, an aerial view or a sky-view image corresponding to the selected capturing area may be output in place of or in addition to the 3D image 1340 showing the capturing altitude. The process of setting the capturing altitude may be similar to the foregoing embodiment.

As another embodiment, a three-dimensional (3D) image showing an altitude changing process (effect) may be output simultaneously or sequentially when a user input for changing the capturing altitude is applied.

Referring to FIG. 13B, a 3D image 1310 showing a capturing direction may be output when two fingers are not released for a predetermined time after setting a capturing area or a capturing area and a capturing altitude with the two fingers according to one of the foregoing embodiments.

Then, the user may set the capturing direction by moving a hand currently touching the screen 151. For example, when a clockwise drag input 1320 is applied, a clockwise-rotated 3D image 1330 may be output to correspond to a degree of the drag input 1320. Similarly, when a counterclockwise drag input is applied, a counterclockwise-rotated 3D image may be output to correspond to the degree of the drag input.

At this time, the capturing direction may be moved in the clockwise or counterclockwise direction based on a preset point of the 3D image 1310. For example, the capturing direction may be moved based on a central point or a focal point of the capturing area.

As another embodiment, the capturing direction may be adjusted by releasing the two fingers and then applying a touch input with one finger. Specifically, the capturing direction may be rotated in the clockwise or counterclockwise direction by applying the drag input in the clockwise or counterclockwise direction after touching the one area of the screen 151.

As another embodiment, an aerial view or a sky-view image corresponding to the selected capturing area may be output in place of or in addition to the 3D image 1310 showing the capturing direction. The process of setting the capturing direction may be similar to the foregoing embodiment.

As another embodiment, a three-dimensional (3D) image showing the capturing direction changing process (effect) may be output simultaneously or sequentially when a user input for changing the capturing direction is applied.

Figure 14:
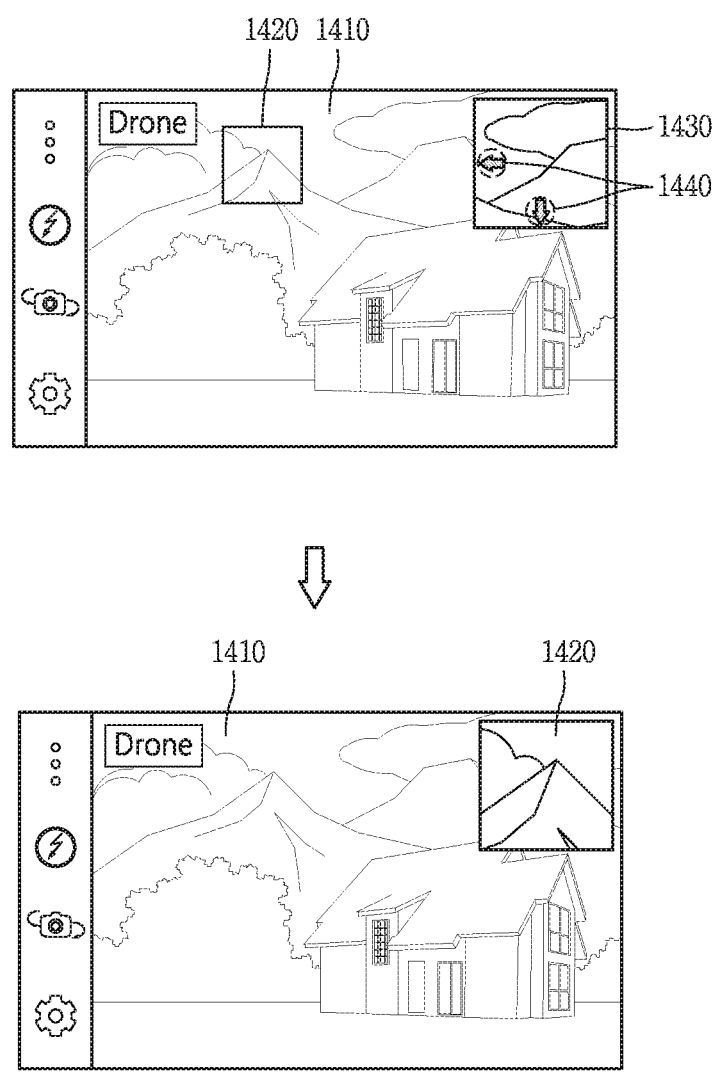
FIG. 14 is a conceptual view illustrating an embodiment in which images captured by a mobile terminal and a drone camera are output together.

FIG. 14 is a conceptual view illustrating an embodiment in which images captured by a mobile terminal and a drone camera are output together.

Referring to FIG. 14, when the user releases the fingers after setting the capturing area, the capturing altitude and the capturing direction according to the embodiments, the drone camera may be activated and capturing guide information corresponding to a set value may be transmitted to the drone camera.

At this time, a preview image 1410 captured by the camera 121 of the mobile terminal 100, a capturing area 1420, and a preview image 1430 currently captured by the drone camera may be output on the screen 151. Further, arrows 1440 indicating a moving direction of the drone camera according to the capturing guide information may be output.

When the drone camera moves according to the capturing guide information, the arrows 1440 indicating the moving direction of the drone camera disappear from the screen 151. In addition, an image 1420 captured by the drone camera may be output on one area of the screen 151 according to the capturing guide information.

As another embodiment, during the movement of the drone camera, an image captured by the drone camera may be output in real time. Alternatively, an image captured by the camera 121 of the mobile terminal 100 according to capturing guide information may be output. To this end, the camera 121 of the mobile terminal 100 may be automatically zoomed in or out.

While the preview image 1410 captured by the mobile terminal 100 and the preview image 1420 currently captured by the drone camera are being output according to one of the foregoing embodiments, at least one of a capturing altitude, a capturing direction and a capturing area may change by applying a preset touch input to the preview image 1420 currently captured by the drone camera.

FIGS. 15A to 15D are conceptual views illustrating an embodiment of changing at least one of a capturing altitude, a capturing direction and a capturing area.

Figure 15A:
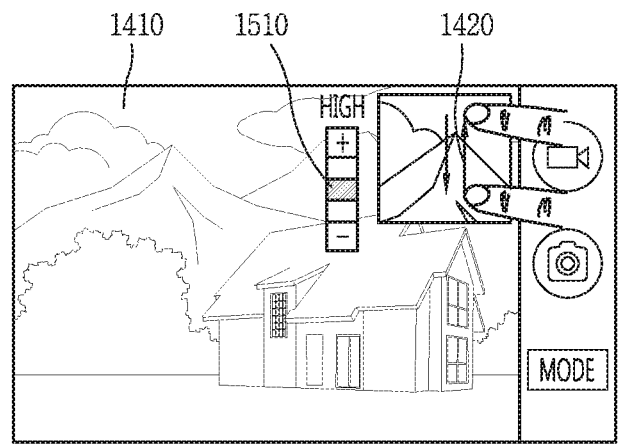
FIGS. 15A to 15D are conceptual views illustrating an embodiment of changing at least one of a capturing height, a capturing direction and a capturing area.

Referring to FIG. 15A, when a drag input is applied upward or downward to the preview image 1420 currently captured by the drone camera with one finger, the capturing altitude of the drone camera may be increased or decreased. At this time, a status bar 1510 indicating the capturing altitude of the drone camera may also be output.

Figure 15B:
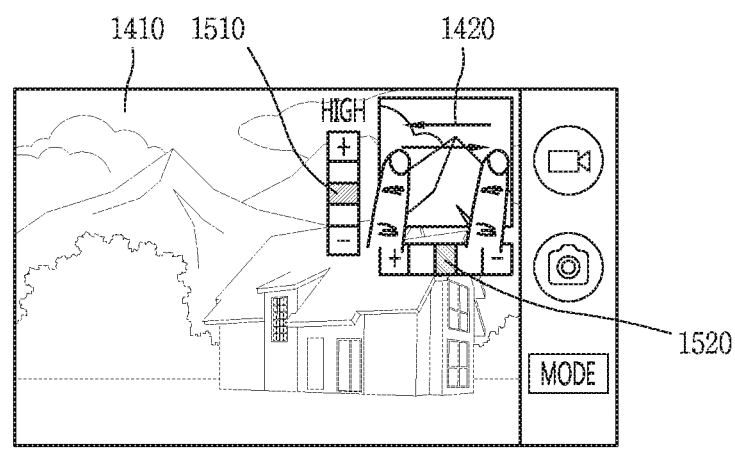

Referring to FIG. 15B, when a drag input is applied to left or right to the preview image 1420 currently captured by the drone camera with one finger, the capturing direction of the drone camera may be shifted to the right or left. At this time, a status bar 1520 indicating the capturing direction of the drone camera as well as the status bar 1510 indicating the capturing altitude of the drone camera may also be output.

Figure 15C:
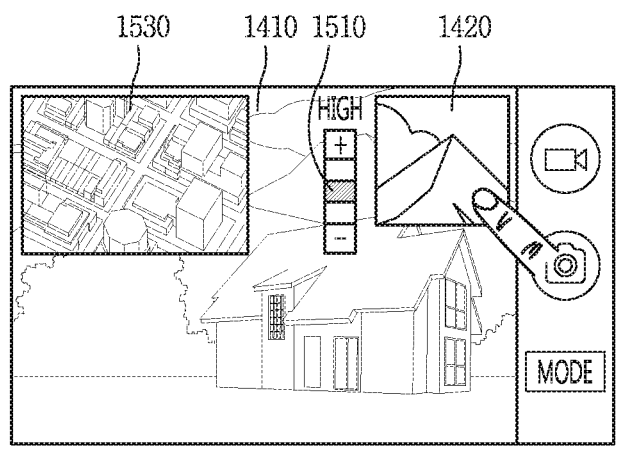

Referring to FIG. 15C, when a touch input is applied to the preview image 1420 currently captured by the drone camera with one finger, an aerial view or sky-view image 1530 corresponding to the capturing guide information (the capturing area, the capturing altitude, the capturing direction, etc.) may also be output.

Afterwards, an altitude or direction of the output aerial view or sky-view image may be adjusted by applying a drag input up or down or to left or right.

Figure 15D:
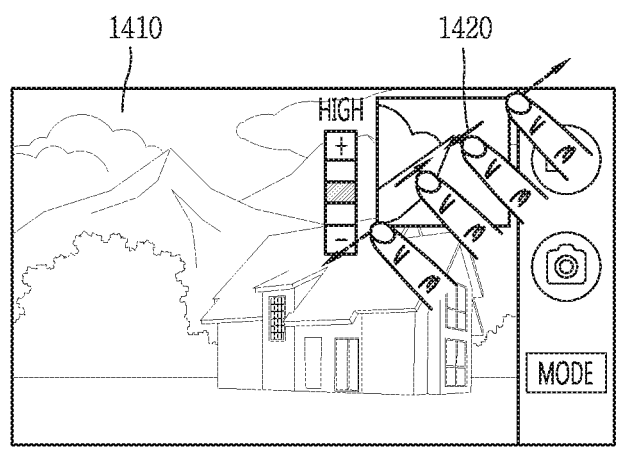

Referring to FIG. 15D, when a pinch-in or pinch-out input is applied to the preview image 1420 currently captured by the drone camera, a size of the capturing area of the drone camera may be reduced or enlarged.

According to the embodiments, the capturing guide information of the drone camera can change fast.

Meanwhile, the controller 180 may control the display unit 151 to output both of a preview image captured by the camera 121 and a preview image taken by the mobile photographing device according to the capturing guide information.

In addition, a capturing setting value for at least one of the preview image captured by the camera and the preview image captured by the mobile photographing device according to the capturing guide information may change, in response to a preset touch input being applied.

As a detailed example, in the state where the preview image 1410 captured by the mobile terminal 100 and the preview image 1420 currently captured by the drone camera are being output according to one of the foregoing embodiments, brightness of at least one of the preview images may change.

FIGS. 16A to 16C and 17A to 17C are conceptual views illustrating embodiments in which brightness of a preview image changes.

Figure 16A:
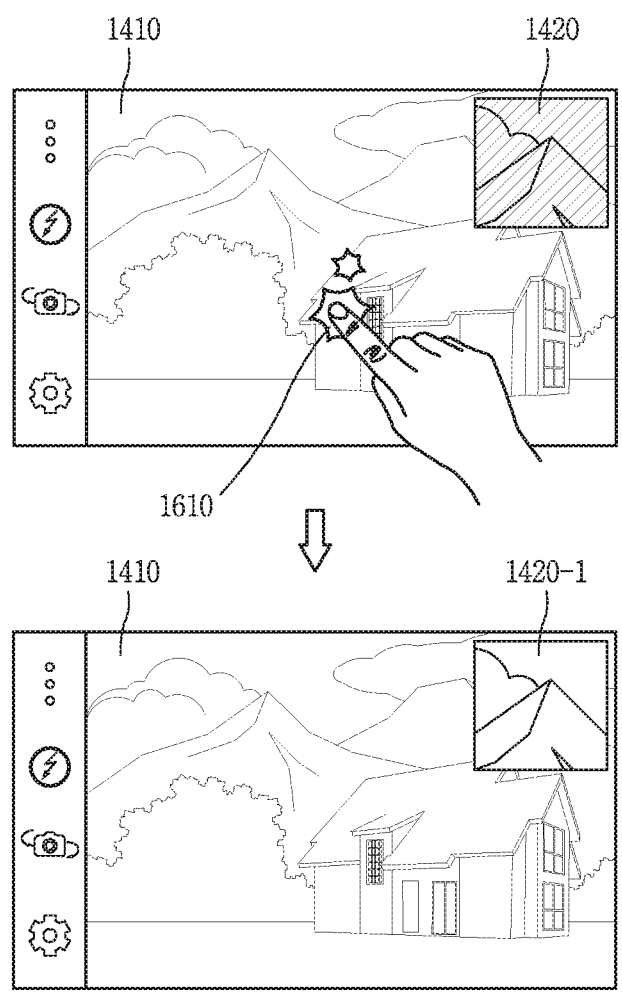

Referring to FIG. 16A, when a tap input 1610 is applied to one area of the preview image 1410 captured by the mobile terminal 100, a brightness setting value of the drone camera may change to be the same as brightness of the preview image captured by the mobile terminal. Accordingly, a preview image 1420-1 whose brightness has changed may be output.

As another embodiment, referring to FIG. 16B, when a tap input 1620 is applied to one area of the preview image 1420 currently captured by the drone camera, a brightness setting vale of the camera 121 of the mobile terminal may change to be the same as brightness of the preview image 1420 currently captured by the drone camera. Accordingly, a preview image 1410-1 whose brightness has changed may be output.

Figure 16C:
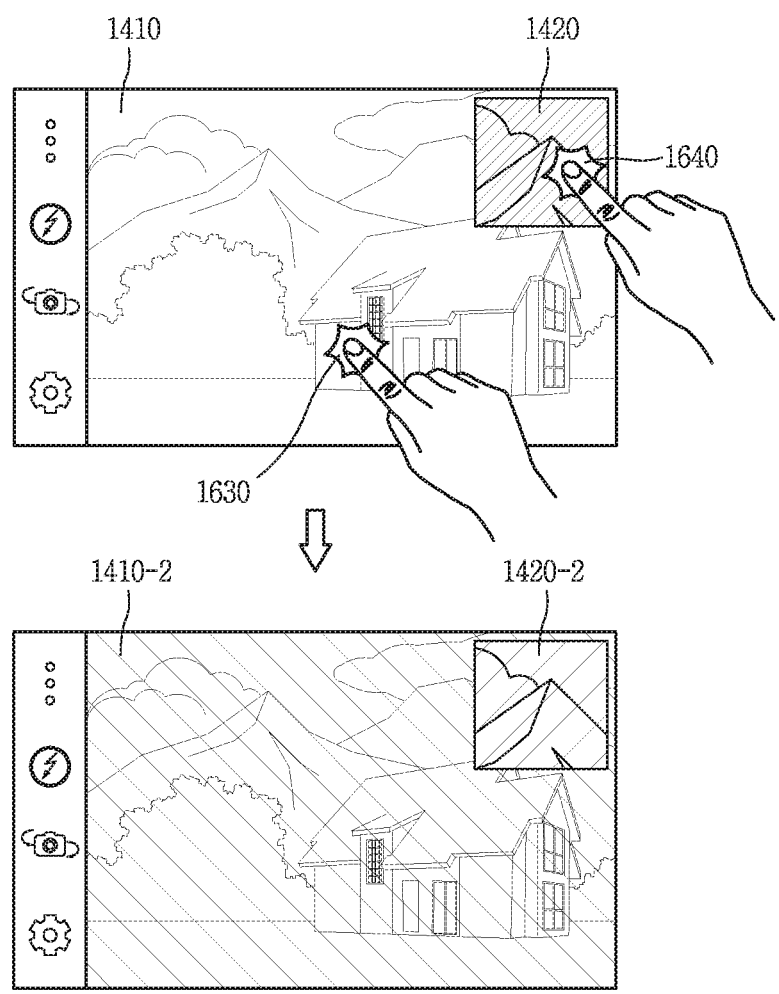

As another embodiment, referring to FIG. 16C, after a touch input 1630 is applied to one area of the preview image 1410 captured by the mobile terminal 100, a touch input 1640 may be applied to one area of the preview image 1420 currently captured by the drone camera within a preset time.

Accordingly, the brightness of each of the camera 121 of the mobile terminal 100 and the drone camera may change to an average value of the brightness of the preview image 1410 captured by the mobile terminal 100 and the brightness of the preview image 1420 currently captured by the drone camera. As a result, preview images 1410-2 and 1420-2 whose brightness has changed to the average value may be output.

As another embodiment, brightness to be a reference of the change may be average brightness of an entire area of a preview image or brightness of one area including a focal area.

As another embodiment, referring to FIG. 17A, when a drag input is applied up or down to one area of the preview image 1410 captured by the mobile terminal with one finger, brightness of the preview image 1410 captured by the mobile terminal may be increased or decreased.

Accordingly, a preview image 1410-a whose brightness has changed may be output, and accordingly a status bar showing the brightness may also be moved up or down (1710).

Figure 17B:
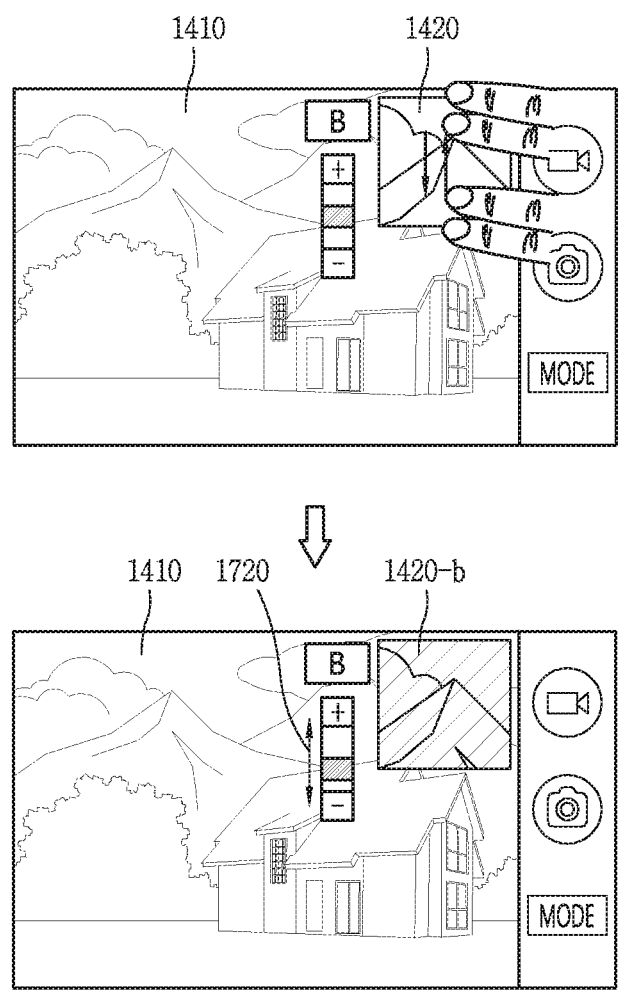

As another embodiment, referring to FIG. 17B, when a drag input is applied up or down to one area of the preview image 1420 currently captured by the drone camera with two fingers, brightness of the preview image 1420 currently captured by the drone camera may be increased or decreased.

Accordingly, a preview image 1420-b whose brightness has changed may be output, and accordingly a status bar showing the brightness is also moved up or down (1720).

As another embodiment, referring to FIG. 17C, when a drag input is applied up or down to one area of the preview image 1410 captured by the mobile terminal 100 with two fingers, the brightness of the preview image 1410 captured by the mobile terminal 100 and the brightness of the preview image 1420 currently captured by the drone camera may be increased or decreased.

For example, the brightness of the preview image 1410 captured by the mobile terminal 100 may be increased or decreased by applying a drag input up or down with a first finger. At the same time or sequentially, when a drag input is applied up or down with a second finger, the brightness of the preview image 1420 currently captured by the drone camera may be increased or decreased.

Accordingly, preview images 1410-c and 1420-c each of which brightness has changed may be output, and status bars each showing the corresponding brightness are also shifted upward or downward (1730 and 1740).

According to the embodiment, the brightness of the camera 121 of the mobile terminal and the brightness of the drone camera can be simultaneously set. In addition, brightness thereof can be independently set.

On the other hand, the drone camera may be captured in an image captured by the camera 121 of the mobile terminal 100 according to the movement of the drone camera.

FIGS. 18A and 18B are conceptual views illustrating an embodiment in which a drone camera is captured in a preview image.

Referring to FIG. 18A, according to the foregoing embodiments, a preview image 1810 captured by the camera 121 of the mobile terminal 100 and a preview image 1820 captured by the drone camera according to capturing guide information may be output.

In this state, when the drone camera 1830 is captured in the preview image 1810 captured by the camera 121 of the mobile terminal 100, a control command for instructing a movement may be transmitted to the drone camera. During this process, an arrow 1840 guiding a moving direction of the drone camera may be displayed on the screen 151.

As a result, the drone camera having received the control command moves according to the guided moving direction, so as to disappear from the screen 151. Further, the drone camera may capture a capturing area in a zoom-in or zoom-out manner.

As another embodiment, referring to FIG. 18B, according to the foregoing embodiments, the preview image 1810 captured by the camera 121 of the mobile terminal 100 and the preview image 1820 captured by the drone camera according to the capturing guide information may be output.

In this state, when the drone camera 1830 is captured in the preview image 1810 captured by the camera 121 of the mobile terminal 100, the preview image 1820 captured by the drone camera may be moved to an output area of the drone camera 1830 and output on the area. During this process, an arrow 1850 indicating a moving direction of the preview image 1820 captured by the drone camera may be output on the screen 151.

As a result, the preview image 1820 captured by the drone camera hides the drone camera 1830 that is output on the screen 151.

Meanwhile, according to the embodiments described above, one preview image may be included in another preview image.

Figure 19A:
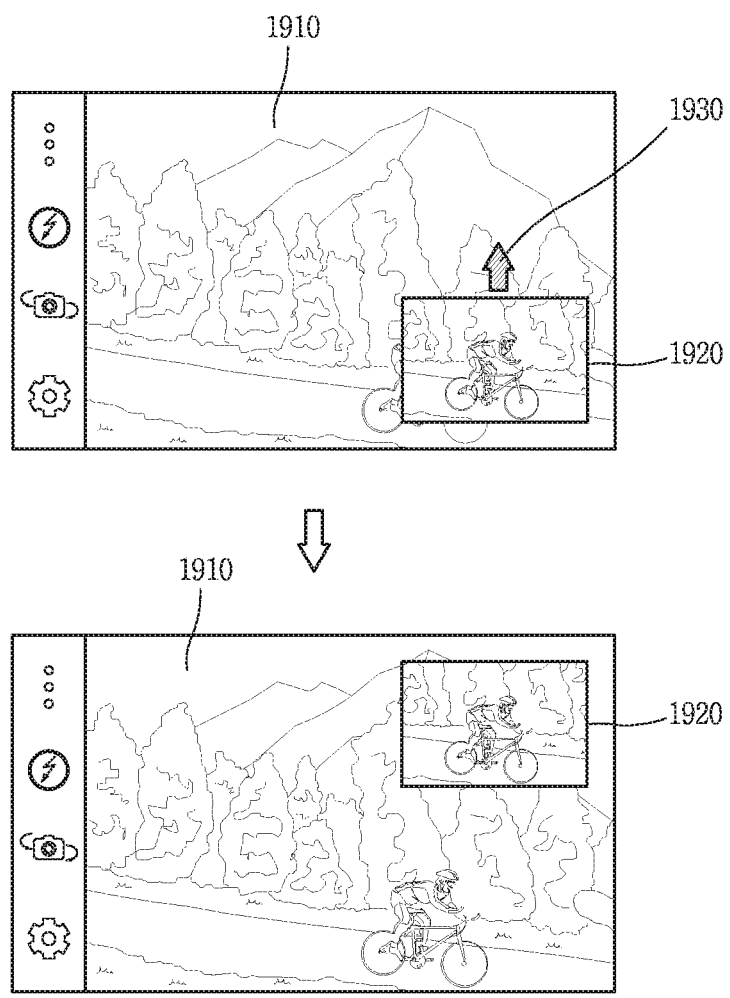
FIGS. 19A and 19B are conceptual views illustrating an embodiment in which one preview image is included in another preview image.
Figure 19B:
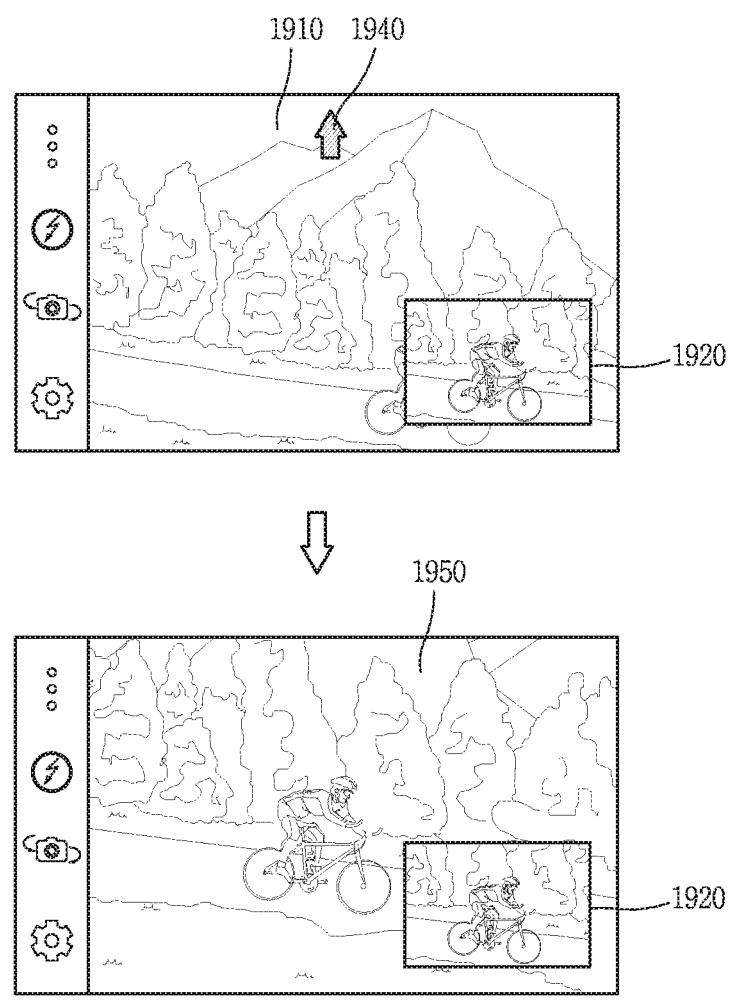

FIGS. 19A and 19B are conceptual views illustrating an embodiment in which one preview image is included in another preview image.

Referring to FIG. 19A, a preview image 1910 captured by the camera 121 of the mobile terminal 100 and a preview image 1920 captured by the drone camera according to the capturing guide information may be output.

As another embodiment, the preview image 1910 captured by the drone camera may be output on the full screen 151 and the preview image 1920 captured by the camera 121 of the mobile terminal 100 may be output in a narrow area.

In this state, when the preview image 1920 output in the narrow area obscures a portion, which corresponds to the preview image output in the narrow area, of the image output on the full screen 151, the preview image 1920 output in the narrow area may be moved and output not to overlap the portion.

During this process, an arrow 1930 indicating a moving direction may be output, and the preview image 1920 output in the narrow area may be moved in the direction and output not to overlap the portion.

As another embodiment, referring to FIG. 19B, when the preview image 1920 output in the narrow area obscures a portion, which corresponds to the preview image output in the narrow area, of the image output on the full screen 151, a preview image 1950 which has been adjusted not to overlap the portion may be output.

For this purpose, the camera 121 of the mobile terminal 100 or the drone camera may be moved or adjusted in a zoom-in or zoom-out manner. In addition, an arrow 1940 indicating the moving direction of the camera 121 or the drone camera may be output.

On the other hand, one preview image and another preview image may be complemented and edited.

Figure 20:
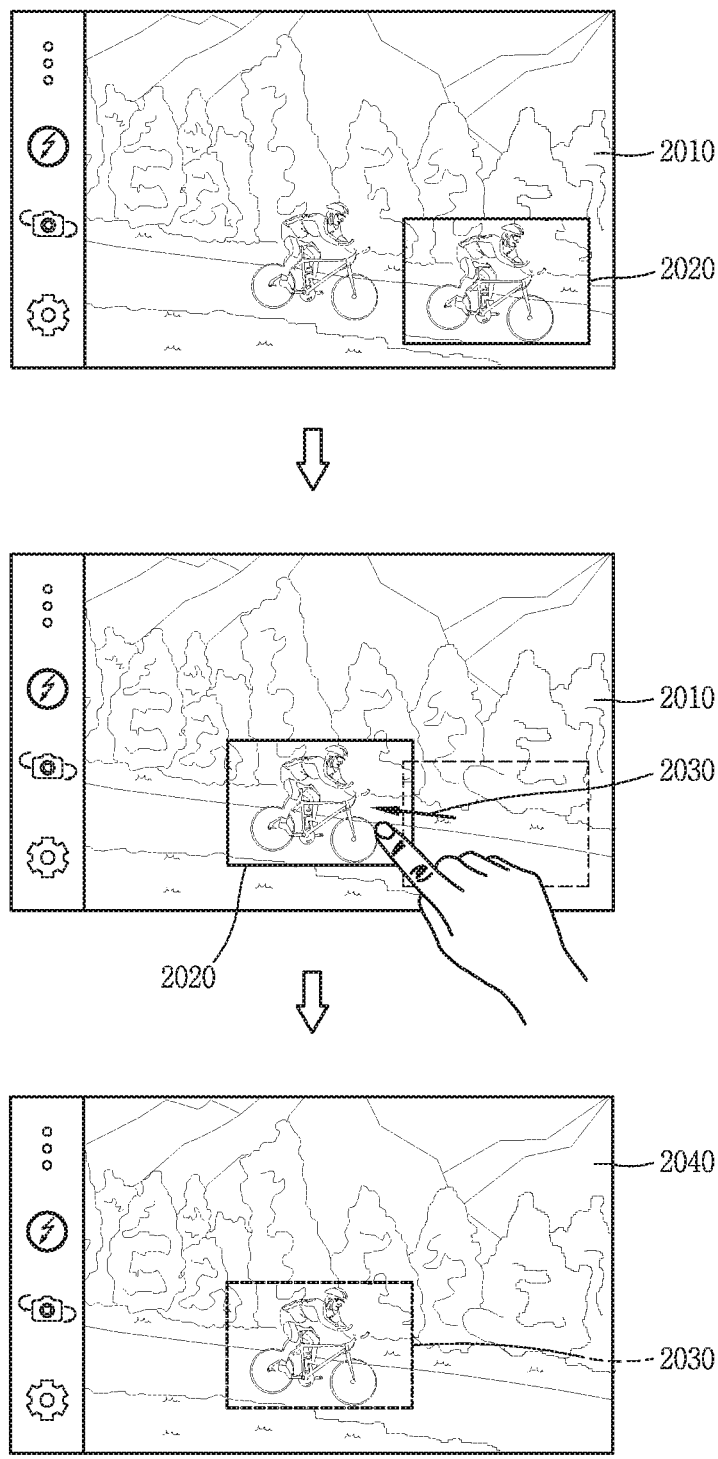
FIG. 20 is a conceptual view illustrating an embodiment in which preview images are merged with each other.

FIG. 20 is a conceptual view illustrating an embodiment in which preview images are merged with each other.

Referring to FIG. 20, a first preview image 2010 and a second preview image 2020 currently captured by the camera 121 of the mobile terminal 100 or the drone camera may be output. At this time, the second preview image 2020 may be an image obtained by capturing a part (hereinafter, referred to as an overlapped area) of the first preview image 2010 at a high resolution.

Further, each of the images 2010 and 2020 may be captured by one of the camera 121 of the mobile terminal 100 or the drone camera. For example, the first preview image 2010 may be captured by the camera of the mobile terminal 100, and the second preview image 2020 may be captured by the drone camera, or vice versa.

Subsequently, when the user applies a drag input 2030 to the second preview image 2020 toward the overlapped area, an image effect indicating this may be output along a boundary (outline) of the second preview image 2020. For example, an image effect of outputting a bold line or a different color, or blinking the image may be output.

Then, when a touched finger is released, a merged image 2040 in which the overlapped area of the first preview image 2010 is replaced with the second preview image 2020, which is the high-resolution image, may be output. At this time, an image effect of displaying the overlapped area for a preset time may be output, for example, the boundary of the overlapped area may be indicated with a dotted line (2030).

In a subsequent embodiment, a drag input may be applied outward to the replaced area, in order to restore an original state.

As another embodiment, a plurality of images may be captured by the drone camera in a panoramic manner. Some of such a plurality of images may be changed to (replaced with) high-resolution images captured by the camera 121 of the mobile terminal 100.

Hereinafter, effects of a mobile terminal and a method of controlling the same according to the present invention will be described.

According to at least one of embodiments of the present invention, a capturing area of a drone camera can be set by the mobile terminal.

In addition, according to at least one of embodiments of the present invention, a capturing altitude and a capturing direction of a drone camera can be set by the mobile terminal.

Then, capturing setting values for the mobile terminal and the drone camera can be changed.

This may result in improving user convenience.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal, comprising:
a camera;
a wireless communication unit configured to perform communication with an external mobile photographing device;
a display unit configured to output a preview image captured by the camera and detect a touch input for designating a capturing area to be captured by the mobile photographing device; and
a controller configured to control, in response to the touch input for designating the capturing area being applied to the preview image, the wireless communication unit such that capturing guide information calculated based on the capturing area is transmitted to the mobile photographing device and a preview image captured by the mobile photographing device according to the capturing guide information is received, and control the display unit to output the preview image captured by the mobile photographing device.

2. The terminal of claim 1, wherein the controller calculates the capturing guide information based on the capturing area, in response to a multi-touch input for designating the capturing area being applied to the preview image captured by the camera.

3. The terminal of claim 2, wherein the controller sets the capturing area in a preset manner based on a multi-touch point to which the multi-touch input has been applied.

4. The terminal of claim 1, wherein the controller calculates the capturing guide information based on the capturing area, in response to a pinch-in or pinch-out input for designating the capturing area being applied to the preview image captured by the camera.

5. The terminal of claim 4, wherein the controller sets the capturing area to include the preview image based on a degree of the pinch-in input applied the preview image.

6. The terminal of claim 4, wherein the controller sets the capturing area to be included in the preview image based on a degree of the pinch-out input applied to the preview image.

7. The terminal of claim 1, wherein the controller calculates the capturing guide information based on a capturing altitude of the mobile photographing device, in response to a user input for designating the capturing altitude being applied.

8. The terminal of claim 1, wherein the controller calculates the capturing guide information based on a capturing direction, in response to a user input for designating the capturing direction of the mobile photographing device being applied.

9. The terminal of claim 1, wherein the controller controls the display unit to output both of the preview image captured by the camera and the preview image captured by the mobile photographing device according to the capturing guide information.

10. The terminal of claim 9, wherein the controller changes a capturing setting value for at least one of the preview image captured by the camera and the preview image captured by the mobile photographing device, in response to a preset touch input being applied.

11. A method for controlling a mobile terminal, the method comprising:
outputting a preview image captured by a camera on a display unit;
transmitting capturing guide information calculated based on a capturing area, which is to be captured by an external mobile photographing device, to a mobile photographing device, in response to a touch input for designating the capturing area being applied to the preview image; and
receiving a preview image captured by the mobile photographing device according to the capturing guide information and outputting the preview image on the display unit.

12. The method of claim 11, further comprising calculating the capturing guide information based on the capturing area, in response to a multi-touch input for designating the capturing area being applied to the preview image captured by the camera.

13. The method of claim 12, further comprising setting the capturing area in a preset manner based on a multi-touch point to which the multi-touch input has been applied.

14. The method of claim 11, further comprising calculating the capturing guide information based on the capturing area, in response to a pinch-in or pinch-out input for designating the capturing area being applied to the preview image captured by the camera.

15. The method of claim 14, further comprising setting the capturing area to include the preview image based on a degree of the pinch-in input applied to the preview image.

16. The method of claim 14, further comprising setting the capturing area to be included in the preview image based on a degree of the pinch-out input applied to the preview image.

17. The method of claim 11, further comprising calculating the capturing guide information based on a capturing altitude of the mobile photographing device, in response to a user input for designating the capturing altitude being applied.

18. The method of claim 11, further comprising calculating the capturing guide information based on a capturing direction of the mobile photographing device, in response to a user input for designating the capturing direction being applied.

19. The method of claim 11, further comprising outputting both of the preview image captured by the camera and the preview image captured by the mobile photographing device according to the capturing guide information.

20. The method of claim 19, further comprising changing a capturing setting value for at least one of the preview image captured by the camera and the preview image captured by the mobile photographing device according to the capturing guide information, in response to a preset touch input being applied.

* * * * *